US011668535B2

(12) United States Patent
Myers et al.

(10) Patent No.: US 11,668,535 B2
(45) Date of Patent: Jun. 6, 2023

(54) COOLING WATER MONITORING AND CONTROL SYSTEM

(71) Applicant: Ecolab USA Inc., Saint Paul, MN (US)

(72) Inventors: Craig Myers, Lisle, IL (US); Anupam Prakash, Aurora, IL (US); Ravindra Raghavapudi, Aurora, IL (US); Steven Kramarczyk, Oswego, IL (US); Stephen J. Hinterlong, Elburn, IL (US); Daniel Meier, Naperville, IL (US); Jorvic Vital, Aurora, IL (US)

(73) Assignee: Ecolab USA Inc., Saint Paul, MN (US)

( * ) Notice: Subject to any disclaimer, the term of this patent is extended or adjusted under 35 U.S.C. 154(b) by 1220 days.

(21) Appl. No.: 16/185,817

(22) Filed: Nov. 9, 2018

(65) Prior Publication Data
US 2019/0145722 A1      May 16, 2019

Related U.S. Application Data

(60) Provisional application No. 62/720,605, filed on Aug. 21, 2018, provisional application No. 62/584,671, filed on Nov. 10, 2017.

(51) Int. Cl.
*F28G 9/00*      (2006.01)
*G01K 17/06*      (2006.01)
(Continued)

(52) U.S. Cl.
CPC ............... *F28G 9/00* (2013.01); *C02F 1/00* (2013.01); *C02F 1/008* (2013.01); *C02F 1/50* (2013.01);
(Continued)

(58) Field of Classification Search
CPC .... C02F 1/00; C02F 1/008; C02F 1/50; C02F 1/66; C02F 5/00; C02F 9/00;
(Continued)

(56) References Cited

U.S. PATENT DOCUMENTS 4,044,605 A      8/1977 Bratthall
4,339,945 A      7/1982 Knudsen et al.
(Continued)

FOREIGN PATENT DOCUMENTS

AU      2001272969 B9      12/2006
CN         1731068 A          2/2006
(Continued)

OTHER PUBLICATIONS

Prasad et al. (Predictive Heat Exchanger Efficiency Monitoring Proceedings of HT2005 2005 ASME Summer Heat Transfer Conference, Jul. 17-22, 2005, San Francisco, California, USA, Published 2005 (Year: 2005).*

(Continued)

*Primary Examiner* — Eric S Ruppert
*Assistant Examiner* — Hans R Weiland
(74) *Attorney, Agent, or Firm* — Fredrikson & Byron, P.A.

(57) ABSTRACT

A method of controlling cooling water treatment may involve measuring operating data of one or more downstream heat exchangers that receive cooling water from the cooling tower. For example, the inlet and outlet temperatures of both the hot and cold streams of a downstream heat exchanger may be measured. Data from the streams passing through the heat exchanger may be used to determine a heat transfer efficiency for the heat exchanger. The heat transfer efficiency can be trended over a period of time and changes in the trend detected to identify cooling waterfouling issues. Multiple potential causes of the perceived fouling issues can be evaluated to determine a predicted cause. A chemical additive selected to reduce, eliminate, or otherwise control the cooling water fouling can be controlled based on the predicted cause of the fouling.

38 Claims, 21 Drawing Sheets

(51) Int. Cl.

| | |
|---|---|
| *G01K 17/10* | (2006.01) |
| *F28G 15/00* | (2006.01) |
| *C02F 103/02* | (2006.01) |
| *C02F 1/50* | (2023.01) |
| *G01N 17/00* | (2006.01) |
| *C02F 1/00* | (2023.01) |
| *C02F 5/00* | (2023.01) |
| *F28F 27/00* | (2006.01) |
| *C02F 1/66* | (2023.01) |

(52) U.S. Cl.
CPC ............ *C02F 1/66* (2013.01); *C02F 5/00* (2013.01); *F28F 27/00* (2013.01); *F28F 27/003* (2013.01); *F28G 15/003* (2013.01); *G01K 17/06* (2013.01); *G01K 17/10* (2013.01); *G01N 17/008* (2013.01); *C02F 2103/023* (2013.01); *C02F 2209/005* (2013.01); *C02F 2209/02* (2013.01); *C02F 2209/06* (2013.01); *C02F 2209/105* (2013.01); *C02F 2209/18* (2013.01); *C02F 2209/40* (2013.01); *C02F 2303/20* (2013.01); *F28F 2200/00* (2013.01)

(58) Field of Classification Search
CPC .......... C02F 2103/023; C02F 2209/005; F28F 27/003; F28G 9/00; F28G 15/003; G01K 17/06; G01K 17/10; G01N 17/008
See application file for complete search history.

(56) References Cited

U.S. PATENT DOCUMENTS

| | | | |
|---|---|---|---|
| 4,383,438 A | 5/1983 | Eaton | |
| 5,085,831 A | 2/1992 | Hickey et al. | |
| 5,126,729 A | 6/1992 | McKinney et al. | |
| 5,171,450 A | 12/1992 | Hoots | |
| 5,190,095 A | 3/1993 | Fujimoto et al. | |
| 5,273,687 A | 12/1993 | Osborne | |
| 5,278,074 A | 1/1994 | Rao et al. | |
| 5,353,653 A | 10/1994 | Watanabe et al. | |
| 5,429,178 A | 7/1995 | Garey et al. | |
| 5,590,706 A | 1/1997 | Tsou et al. | |
| 5,603,840 A | 2/1997 | Strittmatter et al. | |
| 5,734,098 A | 3/1998 | Kraus et al. | |
| 6,454,995 B1 | 9/2002 | Tong | |
| 6,739,290 B2 | 5/2004 | Iwasaki et al. | |
| 6,740,231 B1 | 5/2004 | Bauman et al. | |
| 7,110,906 B2 | 9/2006 | Vesel | |
| 7,146,231 B2 | 12/2006 | Schleiss et al. | |
| 7,455,099 B2 | 11/2008 | Osborn | |
| 7,594,430 B2 | 9/2009 | Beardwood | |
| 7,726,874 B2 | 6/2010 | Kirchberg | |
| 7,827,006 B2 * | 11/2010 | Miller ................... | G05B 23/024 702/183 |
| 3,069,003 A1 | 11/2011 | Friedrich et al. | |
| 8,444,118 B1 | 5/2013 | Dumler et al. | |
| 8,489,240 B2 | 7/2013 | Wan et al. | |
| 8,762,106 B2 | 6/2014 | Miller | |
| 9,364,879 B2 | 6/2016 | Shimoi et al. | |
| 9,689,790 B2 | 6/2017 | Patankar et al. | |
| 9,841,184 B2 | 12/2017 | Kreider et al. | |
| 2002/0105346 A1 | 8/2002 | Banks | |
| 2002/0174678 A1 | 11/2002 | Wilding et al. | |
| 2004/0254682 A1 | 12/2004 | Kast | |
| 2005/0034467 A1 | 2/2005 | Vamey | |
| 2005/0133211 A1 * | 6/2005 | Osborn ................... | F28F 27/00 165/157 |
| 2006/0037399 A1 | 2/2006 | Brown | |
| 2008/0082304 A1 * | 4/2008 | Miller ................... | G05B 23/021 700/275 |
| 2008/0084565 A1 * | 4/2008 | Zribi ................... | G01D 5/35303 356/481 |
| 2009/0090613 A1 | 4/2009 | Cody et al. | |
| 2009/0188645 A1 | 7/2009 | Harpster et al. | |
| 2010/0020844 A1 | 1/2010 | Ashe | |
| 2010/0163469 A1 | 7/2010 | Wan et al. | |
| 2012/0018907 A1 | 1/2012 | Dumler et al. | |
| 2012/0330474 A1 | 12/2012 | Kreider et al. | |
| 2013/0105406 A1 | 5/2013 | Van Der Wal et al. | |
| 2014/0008035 A1 | 1/2014 | Patankar et al. | |
| 2014/0131283 A1 | 5/2014 | Relenyi et al. | |
| 2014/0254682 A1 | 9/2014 | Ying et al. | |
| 2014/0260358 A1 | 9/2014 | Leete et al. | |
| 2015/0003495 A1 | 1/2015 | Aspinall | |
| 2016/0169825 A1 * | 6/2016 | Lehikoinen ............ | F28F 27/00 165/11.2 |
| 2016/0305865 A1 | 10/2016 | Silva et al. | |
| 2018/0149588 A1 * | 5/2018 | Fortunato ............ | G01N 21/45 |
| 2019/0084841 A1 | 3/2019 | Prakash et al. | |

FOREIGN PATENT DOCUMENTS

| | | |
|---|---|---|
| CN | 1873362 A | 12/2006 |
| CN | 101655477 A | 2/2010 |
| CN | 102026921 A | 4/2011 |
| CN | 103629959 A | 3/2014 |
| CN | 104267072 A | 1/2015 |
| CN | 104483448 A | 4/2015 |
| CN | 104502532 A | 4/2015 |
| CN | 104819993 A | 8/2015 |
| CN | 105158293 A | 12/2015 |
| CN | 105445319 A | 3/2016 |
| CN | 105758879 A | 7/2016 |
| CN | 205538771 U | 8/2016 |
| CN | 106017965 A | 10/2016 |
| CN | 205748090 U | 11/2016 |
| CN | 106288940 A | 1/2017 |
| CN | 106872514 A | 6/2017 |
| CN | 106932214 A | 7/2017 |
| CN | 106989908 A | 7/2017 |
| CN | 107091590 A | 8/2017 |
| CN | 206648815 U | 11/2017 |
| EP | 155826 A2 | 9/1985 |
| EP | 1980535 A2 | 10/2008 |
| EP | 2307932 A1 | 4/2011 |
| FR | 2910546 A1 | 6/2008 |
| GB | 770242 A | 3/1957 |
| JP | S5915800 A | 1/1984 |
| JP | H02161293 A | 6/1990 |
| JP | H06330747 A | 11/1994 |
| JP | 2000028557 A | 1/2000 |
| JP | 2005300404 A | 10/2005 |
| JP | 2013015259 A | 1/2013 |
| JP | 2015080780 A | 4/2015 |
| KR | 100652249 B1 | 12/2006 |
| WO | 9911578 | 3/1999 |
| WO | WO-9911578 A1 * | 3/1999 ............ C02F 1/008 |
| WO | 2007137382 A2 | 12/2007 |
| WO | 2011022210 A2 | 2/2011 |
| WO | 2011106712 A2 | 9/2011 |

OTHER PUBLICATIONS

Sun et al., "Research on the method of plate heat exchanger fouling judgement," Applied Energy Technology, No. 5, 2015, pp. 36-39, including English Abstract.

"Heat Exchanger Theory and the Heat Exchanger Design Equation," Bright Hub Engineering, Retrieved online from https://www.brighthubengineering.com/hvac/59900-fundamentals-of-heat-exchanger-theory-and-design/, Dec. 22, 2009, 9 pages.

Prasad et al., "Predictive Heat Exchanger Efficiency Monitoring," Proceedings of HT2005 2005 ASME Summer Heat Transfer Conference, Jul. 17-22, 2005, San Francisco, California, USA ("Prasad"), published in 2005.

Gudmundsson et al., "Method to Detect Fouling in Heat Exchangers," The 11th symposium on District Heating and Cooling, Reykjavik, Iceland ("Gudmundsson"), Aug. 31 to Sep. 2, 2008, Reykjavik, Iceland, published in 2008.

(56) References Cited

OTHER PUBLICATIONS

"3D Trasar Helps Ammonia Plant Maintain Clean Heat Exchangers During Longer Production Runs," Nalco Company, Case Study CH-734, 2007, 4 pages.
Barker et al., "Light oil catalytic processing. Reforming. Process," National Petrochemical and Refiners Association—Question and Answer Session on Refining and Petrochemical Technology, Transcripts (2000), vol. 1990-1999, 12 pages. Abstract Only.
Chaffee et al., "Reducing energy costs . . . [A summary of field experiences in managing heat recovery systems using different monitoring means and the use of antifoulants to minimise refinery fouling related energy costs]," International Journal of Hydrocarbon Engineering (Dec. 1998), vol. 4, No. 1, pp. 55, Abstract Only.
Chattoraj et al., "On-line measurement and control of microbiological activity in industrial water systems," NACE International, Corrosion 2001, 9 pages, Abstract Only.
Chen et al., "Corrosion and Corrosion Product Transport Monitoring in Boiler Condensate Systems," NACE International, Paper No. 336, 1994, 18 pages, Abstract Only.
"Coil Flo: Air Cooler Performance Cleaning," Nalco Company, Bulletin B-733, 2006, 2 pages.
De Oliveira Filho et al., "A matrix approach for steady-state simulation of heat exchanger networks," Applied Thermal Engineering, vol. 27, No. 14-15, Oct. 2007, pp. 2385-2393, Abstract Only.
Enzien et al., "On-line performance monitoring of treatment programs for MIC control," NACE International, Corrosion 2001, 13 pages, Abstract Only.
Hale et al., "Corrosion control in cooling water systems: recent experience using a new corrosion monitor," International Conference on Corrosion in Refinery Petrochemical and Power Generation Plants; Venezia; Italy; May 18-19, 2000. pp. 367-376, Abstract Only.
Hatch et al., "Real world experiences with a new cooling water automation system," NACE International, Corrosion 2003, 22 pages, Abstract Only.
Herrmann et al., "On-line data monitoring improves antifoulant performance," NPRA 1991 Annual Meeting, Mar. 1991, 14 pages, Abstract Only.
Hoots et al., "Latest methods of performance optimization and control in cooling water," NACE International, Corrosion 2001, 25 pages, Abstract Only.
Hoots et al., "New methods for on-line monitoring/control of corrosion inhibitors and performance relationships," 8th European Symposium on Corrosion Inhibitors. vol. 1; Ferrara; Italy; Sep. 18-22, 1995. pp 533-542, Abstract Only.
Hoots, "Tagged polymer technology for improved cooling system monitoring and Control," NACE, Corrosion 1993, 7 pages. Abstract Only.
Hoots et al., "The use of fluorescent tracer significantly improves west coast refinery's control of cooling water treatment," NACE, Corrosion 1991, 11 pages, Abstract Only.
Hoots et al., "Use of fluorescent tracer significantly improves control of cooling water treatment," Materials Performance (1992), vol. 31, No. 2, pp. 46-51, Abstract Only.
International Patent Application No. PCT/US2018/060071, International Search Report and Written Opinion dated Jan. 28, 2019, 15 pages.
Licina, "Monitoring system fouling with a model heat exchanger and an electrochemical biofilm activity probe," Proceedings of the American Power Conference, vol. 60, No. 2, 1998, pp. 965-968, Abstract Only.
"Maximising Heat Exchange Efficiency: Another Solution from the Industry Leader," Nalco Company, Brochure E-235E, 2004, 2 pages.
Mazur et al., "Innovative technology uniting new chemicals with advanced monitoring and control optimizes the performance of cooling water systems in metal production processes," Light Metals 2005—Proceedings of the Technical Sessions Presented by the TMS Aluminium Committee, pp. 995-1000, Abstract Only.
Moriarty et al., "Methods to monitor and control scale in cooling water systems," NACE International, Corrosion 2001, 26 pages, Abstract Only.
Moriarty et al., "Monitoring polymeric treatment programs in alkaline cooling water," NACE, Corrosion 1989, Paper No. 156, 14 pages, Abstract Only.
Ohtsu et al., "Application of analysis and control for corrosion damage in cooling water systems using corrosion monitoring," NACE International Corrosion Conference, Mar. 22-26, 2009, 14 pages, Abstract Only.
Roberts et al., "On-line, real-time expert system for cooling water," Proc.—Int. Water Conf., Eng. Soc. West. Pa. 49th 123-34 (1988), pp. 123, Abstract Only.
Schreier et al., "Heat exchanger fouling: A model study of the scaleup of laboratory data," Chemical Engineering Science, vol. 50, No. 8, Apr. 1995, pp. 1311-1321, Abstract Only.
Shen et al., "Petrochemical processing. Ethylene," National Petrochemical and Refiners Association—Question and Answer Session on Refining and Petrochemical Technology, Transcripts (2000),vol. 1990-1999, 5 pages, Abstract Only.
Sotoudeh et al., "On-line cleaning of year-round building HVAC loops," Corrosion 1999, 20 pages, Abstract Only.
Stuart et al., "Practical experience with advanced on-line monitoring techniques," Materials Performance (1990), vol. 29, No. 11, pp. 63-69, Abstract Only.
Wetegrove et al., "Optical monitor for improved fouling control in cooling systems," Journal of the Cooling Tower Institute (1997), vol. 18, No. 1, pp. 52-56, Abstract Only.
Winters et al., "Real-time performance monitoring of fouling and under-deposit corrosion in cooling water systems," Corrosion Science, vol. 35, No. 5-8, 1993, pp. 1667-1675, Abstract Only.
Winters et al., "Simultaneous Corrosion and Fouling Monitoring Under Heat Transfer in Cooling Water Systems," ASTM Specal Technical Publication, Electrochemical Noise Measurement for Corrosion Applications, No. 1277, 1996, pp. 230-246, Abstract Only.
Yamashita, "Model-based monitoring of fouling in a heat exchanger," 6th International Symposium on Advanced Control of Industrial Processes (AdCONIP), Taipei, Taiwan, May 28-31, 2017, pp. 453-456.
Yang, "A Novel Method for On-Line Determination of Underdeposit Corrosion Rates in Cooling Water Systems," NACE International, Paper No. 335, 1994, pp. 26, Abstract Only.
Yang, "A Novel Method for On-Line Determination of Underdeposit Corrosion Rates in Cooling Water Systems," NACE, Corrosion, 1994, No. 335, pp. 27, Abstract Only.
Yang, "Advances in localized corrosion control in cooling water systems," 9th European Symposium on Corrosion Inhibitors. vol. 2; Ferrara; Italy; Sep. 4-8, 2000. pp. 821-834, Abstract Only.
Yang, "Localized corrosion monitoring in cooling water systems," NACE, Corrosion 1995, 23 pages, Abstract Only.
Yang, "Minimizing localized corrosion via new chemical treatments and performance based treatment optimization and control," Corrosion 1999, 27 pages, Abstract Only.
Yang, "Real-Time Localized Corrosion Monitoring in Industrial Cooling Water Systems," Corrosion, vol. 56, No. 7, Jul. 2000, pp. 743-756, Abstract Only.
Yang, "Real-Time Localized Corrosion Monitoring in Industrial Cooling Water Systems," Corrosion Reviews, vol. 19, No. 3-4, 2001, pp. 315-346, Abstract Only.
Yang, "Real time localized corrosion monitoring [(LCM)] in refinery cooling water systems," NACE, Corrosion 1998, Paper No. 595, 27 pages, Abstract Only.
Yu et al., "Unique chemistry and control technology merge to improve cooling water performance and control," NACE Meeting Papers, Corrosion 2004, 11 pages, Abstract Only.

* cited by examiner

COOLING WATER MONITORING AND CONTROL SYSTEM

CROSS-REFERENCE

This application claims the benefit of U.S. Provisional Patent Application No. 62/584,671, filed Nov. 10, 2017, and U.S. Provisional Patent Application No. 62/720,605, filed Aug. 21, 2018, the entire contents of each of which are incorporated herein by reference.

TECHNICAL FIELD

This disclosure relates to cooling water systems and, more particularly, to cooling water control systems.

BACKGROUND

Water cooling towers are used in large capacity heat exchange systems, such as those found in oil refineries and chemical production plants. Cooling towers are used to remove absorbed heat from a circulating water coolant by evaporating a portion of the coolant in the cooling tower. The remaining coolant can be extracted from a reservoir or sump at the base of the tower by a pump, and supplied through the heat load on a continuous basis. Because a large quantity of water evaporates in such a system, scale, silt, or other water contaminants may build up in the recirculating water over time.

To help prevent or limit the extent to which fouling occurs on surfaces contacted by the recirculating cooling water, various chemicals may be added to the cooling water. In a typical operating environment, a technician may take samples of cooling water from the cooling water system and perform chemical analysis on the samples. The technician may adjust the type of chemical added to the cooling water based on the analysis. Oftentimes, the technician may only be onsite at the facility to perform cooling water analysis on a limited basis, such as once a week or once a month. As a result, changes in facility process conditions may not be detected until some time after the process conditions have altered. Moreover, even where cooling water chemistry is changed to account for changed process conditions, such charges are generally reactionary rather than predictive changes to prevent undesirable cooling water conditions.

SUMMARY

In general, this disclosure is directed to techniques and systems for monitoring and controlling cooling water. In some examples, the conditions of the cooling water in the cooling water circuit are monitored and/or controlled by evaluating the thermal performance of one or more downstream heat transfer units through which the cooling water is conveyed. For example, a heat exchange network may include one or more cooling towers that are fluidly connected to and supply cooling water to multiple heat exchanges. The cooling water may pass through one side of each heat exchanger while a process fluid to-be-cooled passes through another side of the heat exchanger, with the fluids being separated by a solid metallic wall. Heat exchange across the heat exchanger can take place in a co-current (parallel) or counter-current (opposite) direction.

To deploy the cooling water control system, multiple heat exchangers within the cooling water circuit can be surveyed to identify one or more heat exchangers that are critical to the operating performance of the facility at which the heat exchangers are located. For example, the heat exchangers may be evaluated to determine their fouling history, the availability of a bypass heat exchanger within the circuit should fouling conditions become material, sensitivity to water-side fouling, or other conditions indicating that the heat transfer efficiency of one or more particular exchangers is critical to the user's process integrity. To the extent a heat exchanger identified as being critical is not already instrumented for monitoring, various monitoring equipment may be added to monitor the performance of the heat exchanger. For example, temperature sensors to measure the temperature of the cooling water stream entering and exiting the heat exchanger as well as the temperature of the process stream entering and exiting the heat exchanger may be added. As another example, a sensor to measure the flow rate of cooling water passing through the exchanger and/or differential pressure sensors to measure pressure drop across the exchanger may be added.

Independent of the types of parameters monitored for the critical heat exchanger, a parameter corresponding to the heat transfer efficiency of the heat exchanger may be determined based, at least in part, on the temperature data. For example, a trend of the heat transfer efficiency of the heat exchanger may be established to provide a reference from which future deviations from the trend can be determined. The heat transfer efficiency of the heat exchanger can be subsequently monitored and changes in the heat transfer efficiency detected. Changes in the heat transfer efficiency trend may indicate incipient or accelerating fouling, which can provide detectable evidence for taking interventional cooling water control action to stop or mitigate the effects of such fouling.

In practice, changes in heat transfer efficiency trend can have many different cooling water-related root causes. The appropriate cooling water control action to mitigate a detected negative deviation in heat transfer efficiency trend can vary depending on the underlying root cause. In some examples according to the present disclosure, the cooling water control technique involves obtaining data indicative of multiple different types of potential root causes that may be causing fouling leading to deteriorating heat transfer efficiency conditions. For example, an array of sensors may be provided to measure different characteristics and parameters of the cooling water that passes through the heat exchanger whose thermal efficiency characteristics are being monitored. The sensors can provide data indicative of different types of fouling mechanisms, such as scale fouling, corrosion fouling, and biofouling. A single sensor measurement or parameter may be associated with a particular fouling mechanism. Alternatively, multiple different parameters of the cooling water may be measured to provide data indicative of a particular fouling mechanism.

In either case, a predicted root cause of the fouling leading to the changed heat transfer efficiency trend can be determined based on the data associated with the different types of fouling mechanisms. For example, data associated with each particular type of fouling mechanism may be scaled and/or weighed to identify a particular cause or mechanism that is more likely than the other causes or mechanisms being evaluated to be causing the fouling. Cooling water control actions can then be taken to counteract the predicted fouling cause. For example, one or more chemical additives selected to counteract the predicted fouling cause can be introduced into the cooling water and/or the rate of such chemical additive(s) can be adjusted. Additionally or alternatively, the cooling water tower may be blown down, replacing a portion of the circulating cooling water with fresh makeup water.

In some applications, the heat transfer efficiency of the critical heat exchanger is monitored to evaluate the efficacy of the corrective action(s) taken in response to the predicted fouling cause. For example, the heat transfer efficiency of the critical heat exchanger may be monitored to detect a second change in the heat transfer efficiency trend, e.g., indicating that the heat transfer efficiency is deteriorating at a slower rate than prior to taking the corrective action(s). If a change in the heat transfer efficiency trend is not detected in response to the corrective action(s) and/or the heat transfer efficiency trend deteriorates even further than prior to taking such corrective action, it may be determined that the predicted root cause is not the actual root cause of the fouling problem. Accordingly, an alternative predicted root cause can be identified and one or more alternative cooling water control actions taken. As one example, one or more chemical additives selected to counteract the alternative predicted fouling cause can be controlled in lieu of the additives controlled to counteract the original predicted fouling cause.

By accurately and rapidly detecting and reacting to incipient fouling conditions on the cooling water side of the heat exchanger, more severe fouling may be avoided. In some applications, real-time monitoring and control are provided to facilitate rapid response to unexpectedly deteriorating heat exchanger thermal efficiency conditions. This rapid intervention may extend the service life of the heat exchanger until the next physical cleaning in a way that is not achievable if the heat exchanger becomes fully fouled before detecting the fouled conditions.

In one example, a method is described that includes monitoring a heat transfer efficiency of at least one heat exchanger and establishing a heat transfer efficiency trend for the heat exchanger. The heat exchanger has a process stream-side and a cooling water stream-side. The method includes detecting a change in the heat transfer efficiency trend. The method further involves receiving data indicative of scale fouling on the cooling water stream-side, data indicative of corrosion fouling on the cooling water stream-side, and data indicative of biofouling on the cooling water stream-side. The method includes determining a predicted cause of the detected change in the heat transfer efficiency trend and controlling addition of a chemical additive into a cooling water that is in fluid communication with the cooling water stream-side of the at least one heat exchanger based on the predicted cause.

In another example, a method of controlling a cooling water system is described. The method involves surveying a plurality of heat exchangers within a heat exchanger network to identify at least one critical heat exchanger. The method includes monitoring a heat transfer efficiency of the critical heat exchanger, establishing a heat transfer efficiency trend for the critical heat exchanger, and detecting a change in the heat transfer efficiency trend. In addition, the method involves receiving data indicative of scale fouling on the cooling water stream-side, receiving data indicative of corrosion fouling on the cooling water stream-side, receiving data indicative of biofouling on the cooling water stream-side. The method also involves determining a predicted cause of the detected change in the heat transfer efficiency trend, where the predicted cause includes a cause selected from the group consisting of scale fouling, corrosion fouling, and biofouling. The method further involves controlling addition of a chemical additive into cooling water that is in fluid communication with the cooling water stream-side of the at least one critical heat exchanger based on the predicted cause and detecting a change in the heat transfer efficiency trend in response to the controlled addition of the chemical additive into the cooling water.

In another example, a method of controlling cooling water treatment is described. The method includes receiving data from a plurality of sensors indicative of at least a temperature of a cooling water stream entering a heat exchanger, a temperature of the cooling water stream exiting the heat exchanger, a temperature of a process stream entering the heat exchanger, and a temperature of the process stream exiting the heat exchanger. The method also involves determining a heat transfer efficiency for the heat exchanger based on the received data from the plurality of sensors and establishing a heat transfer efficiency trend for the heat exchanger over a period of time. The method further involves detecting a change in the heat transfer efficiency trend and controlling addition of a chemical additive into the cooling water stream in response to the change detected in the heat transfer efficiency trend for the heat exchanger.

In another example, a system is described that includes a cooling tower, a heat exchanger, a plurality of sensors, a pump, and a controller. The cooling tower reduces a temperature of a cooling water stream through evaporative cooling. The heat exchanger has a cooling water inlet, a cooling water outlet, a process stream inlet, and a process stream outlet. The plurality of sensors are positioned to measure a temperature of a cooling water stream entering the heat exchanger through the cooling water inlet, a temperature of the cooling water stream exiting the heat exchanger through the cooling water outlet, a temperature of a process stream entering the heat exchanger through the process stream inlet, and a temperature of the process stream exiting the heat exchanger through the process stream outlet. The pump is positioned upstream of the heat exchanger and configured to inject a chemical additive into the cooling water stream. The controller is communicatively coupled to the plurality of sensors and the pump and configured to: receive data from the plurality of sensors, determine a heat transfer efficiency for the heat exchanger based on the received data from the plurality of sensors, establish a heat transfer efficiency trend for the heat exchanger over a period of time, detect a change in the heat transfer efficiency trend, and control the pump in response to the change detected in the heat transfer efficiency trend for the heat exchanger.

The details of one or more examples are set forth in the accompanying drawings and the description below. Other features, objects, and advantages will be apparent from the description and drawings, and from the claims.

DETAILED DESCRIPTION

This disclosure is generally directed to cooling water monitoring and control systems, including systems and techniques for controlling the addition of one or more chemical agents to a cooling water source used for thermal exchange with one or more comparatively hot streams. The one or more chemical agents added to the cooling water may prevent or minimize the extent to which fouling deposits on heat exchange surfaces in fluid contact with the cooling water. This can improve the efficiency of the facility in which the heat exchange network with controlled cooling water chemical addition is implemented.

While the systems and techniques according to the disclosure can be implemented for any desired cooling water system and any heat exchanger application, in some examples, the techniques are implemented in systems of networked heat exchangers. The cooling water side of the networked heat exchangers may be fluidly coupled with each other such that cooling water recirculates through the network and passes through multiple heat exchangers within the network, e.g., in series and/or in parallel. In applications where multiple heat exchangers share recirculating cooling water, the heat exchangers may be surveyed to identify one or more critical heat exchangers within the network on which further monitoring may be performed for controlling the cooling water system. The heat exchangers may be evaluated to identify one or more particular heat exchangers within the network which, based on their likelihood of fouling, their current performance relative to overall design, sensitivity to water-side fouling and/or their criticality to the overall process, should be monitored more closely than other heat exchangers in the network. Such a heat exchanger may be designated a critical heat exchanger and thermal efficiency monitoring may be performed on the heat exchanger for controlling the cooling water system that supplies both the critical heat exchanger(s) as well as other heat exchangers within the network.

Figure 1:
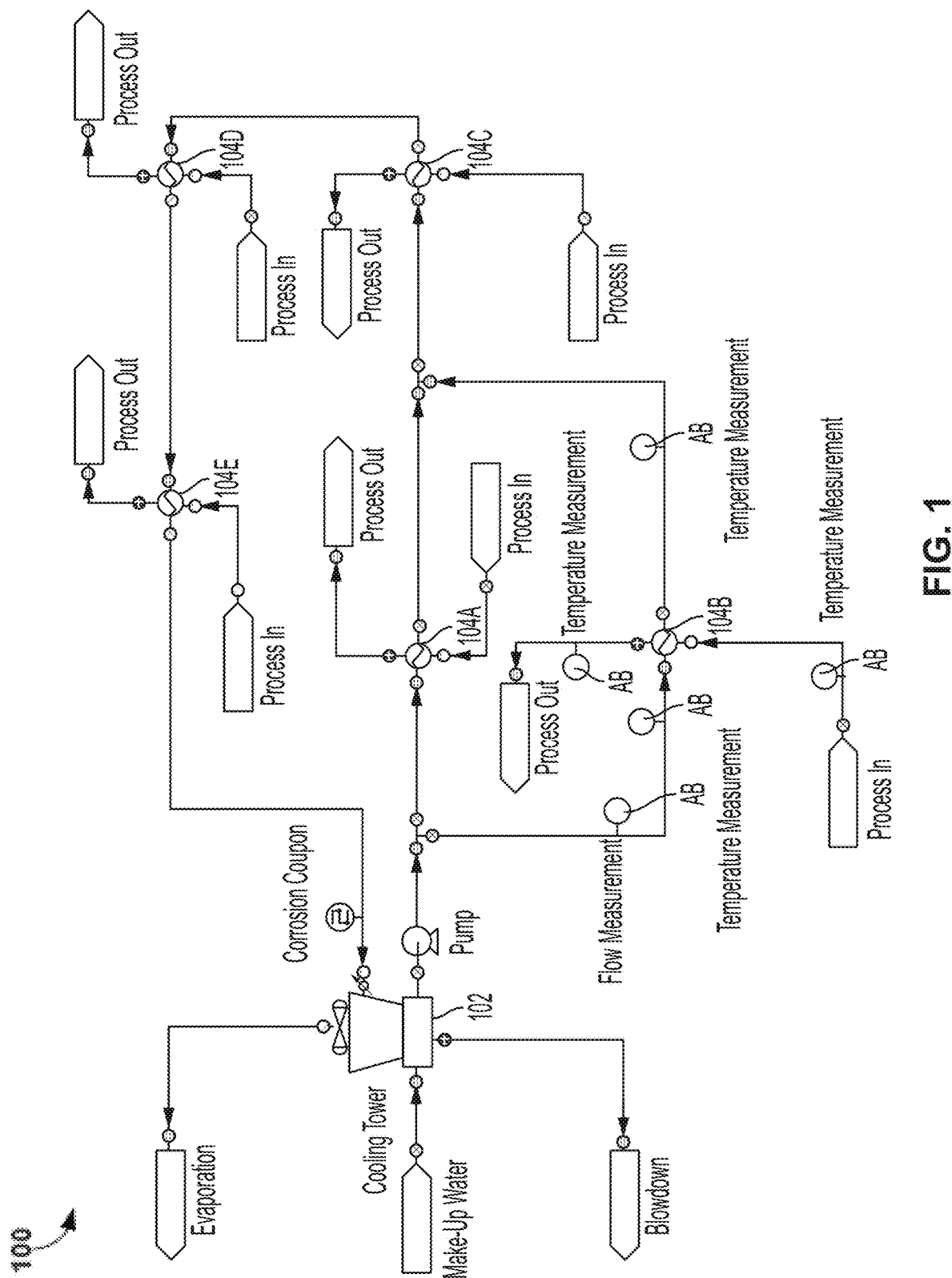
FIG. 1 is a flow diagram illustrating an example heat exchanger network containing multiple heat exchangers in which a cooling water monitoring and control system according to FIG. 2 may be implemented.

FIG. 1 is a flow diagram illustrating an example heat exchanger network 100 containing multiple heat exchangers in which a cooling water monitoring and control system according to the disclosure may be implemented. As shown in this example, multiple heat exchangers 104A-104E are fluidly connected to a cooling water stream supplied by cooling tower 102. Cooling water flows in parallel through heat exchangers 104A and 104B followed, in series, through heat exchangers 104C-104E before returning to the cooling tower. Each heat exchanger 104 has a process stream-side and a cooling water stream-side, which are divided from each other and allow thermal energy to transfer from the a process stream passing through the process stream-side to a cooling water stream passing through the cooling water stream-side. While heat exchanger network 100 in FIG. 1 is illustrated as having five heat exchangers, it should be appreciated that a heat exchanger network may have fewer heat exchangers (e.g., two, three, four), or more heat exchangers (e.g., six, seven, or more) and the disclosure is not limited in this respect.

In applications where there are multiple heat exchangers in a network, one or multiple of the heat exchangers (and, optionally, all of the heat exchangers) may include sensors as described in connection with heat exchanger 104 in FIG. 2. A controller managing the cooling water system can receive data from the sensors. The data can provide information concerning the heat transfer efficiency of one more heat exchangers being monitored within heat exchanger network 100 and/or the characteristics of cooling water flowing through the system. The characteristics of the cooling water flowing through the system received by the controller may be indicative of potential fouling causes occurring within the heat exchanger network, as also described in greater detail below. Accordingly, cooling water control actions may be taken to try and mitigate detected fouling within the heat exchanger network 100.

While data may be collected relating to the heat transfer efficiency of all heat exchangers within heat exchanger network 100, in practice, the number of exchangers needing to be monitored and the different fouling conditions in each heat exchanger may make such expansive monitoring impractical. Accordingly, in these applications, an initial survey of multiple of the heat exchangers within the network (optionally, all of the heat exchangers within the network) may be performed to identify one or more particular heat exchangers for which further monitoring is appropriate. The survey may involve obtaining historical operational, historical design, and/or current performance data for the heat exchangers being surveyed to designate one or more heat exchangers as being more critical than others within the network for monitoring (e.g., only one heat exchanger, two heat exchangers, or more heat exchangers as being critical).

The particular attributes of a heat exchanger within heat exchanger network 100 that may make it a critical heat exchanger for further monitoring can vary depending on the specific application. In general, the survey may seek to identify which heat exchanger or heat exchangers within heat exchanger network 100 have a more significant impact on the efficiency and operability of the overall process in which the heat exchanger network is integrated if fouled. As one example, if a particular heat exchanger in heat exchanger network 100 has a history of fouling on the cooling water side at a faster rate than other heat exchangers within the network (e.g., potentially dictating the cleaning cycle for the entire heat exchanger network) such an exchanger may be designated a critical heat exchanger. As another example, if the operating performance of a particular heat exchanger in the heat exchanger network 100 is deviating from its design operating performance more than other heat exchangers within the network, such an exchanger may be designated a critical heat exchanger. While performance characteristics for criticality may vary, e.g., depending on the design configuration and target operating characteristics of the heat exchanger, parameters such as a cooling water velocity less than 1 foot/second through the exchanger and/or a cooling water stream exit temperature greater than 140 degrees Fahrenheit may indicate a higher likelihood of fouling warranting the heat exchanger being designated a critical heat exchanger.

In evaluating whether a particular heat exchanger in heat exchanger network 100 should be designated a critical heat exchanger for further monitoring, the availability of bypass heat exchangers may be taken into account. A bypass heat exchanger may be another heat exchanger within heat exchanger network 100, e.g., that is in parallel to the heat exchanger being evaluated for criticality. The bypass heat exchanger may be off-line or may otherwise have additional throughput capacity. In the event that the main exchanger becomes fouled, the bypass heat exchanger may be brought online and/or additional flow directed from the main exchanger to the bypass heat exchanger. Accordingly, while fouling in the main exchanger being evaluated for criticality may be impactful, the availability of the bypass exchanger to redirect flow without shutting down the entire heat exchanger network and/or process may lead against designating the main exchanger is a critical exchanger.

A controller associated with the cooling water control system may receive data associated with the criticality of multiple heat exchangers within heat exchanger network 100 and identify one or more critical heat exchangers within the network on which further monitoring should be performed. For example, data associated with historical operational, historical design, and/or current performance data for the heat exchangers being surveyed may be stored in a memory associate with the controller. Software executing on the controller can then analyze the stored data to identify with one or more heat exchangers within heat exchanger network 100 as being a critical heat exchanger. Alternatively, a user implementing the cooling water control method may designate a particular heat exchanger or heat exchangers as being critical based on site-specific factors.

Independent of the characteristics and process used to designate a particular heat exchanger as being critical, the heat exchanger so designated may be monitored to obtain information and insights into the state of the cooling water flowing through the heat exchanger. For example, sensors may be added to monitor streams flowing through the critical heat exchanger to provide data relating to the thermal efficiency of the heat exchanger for controlling the cooling water system.

Figure 2:
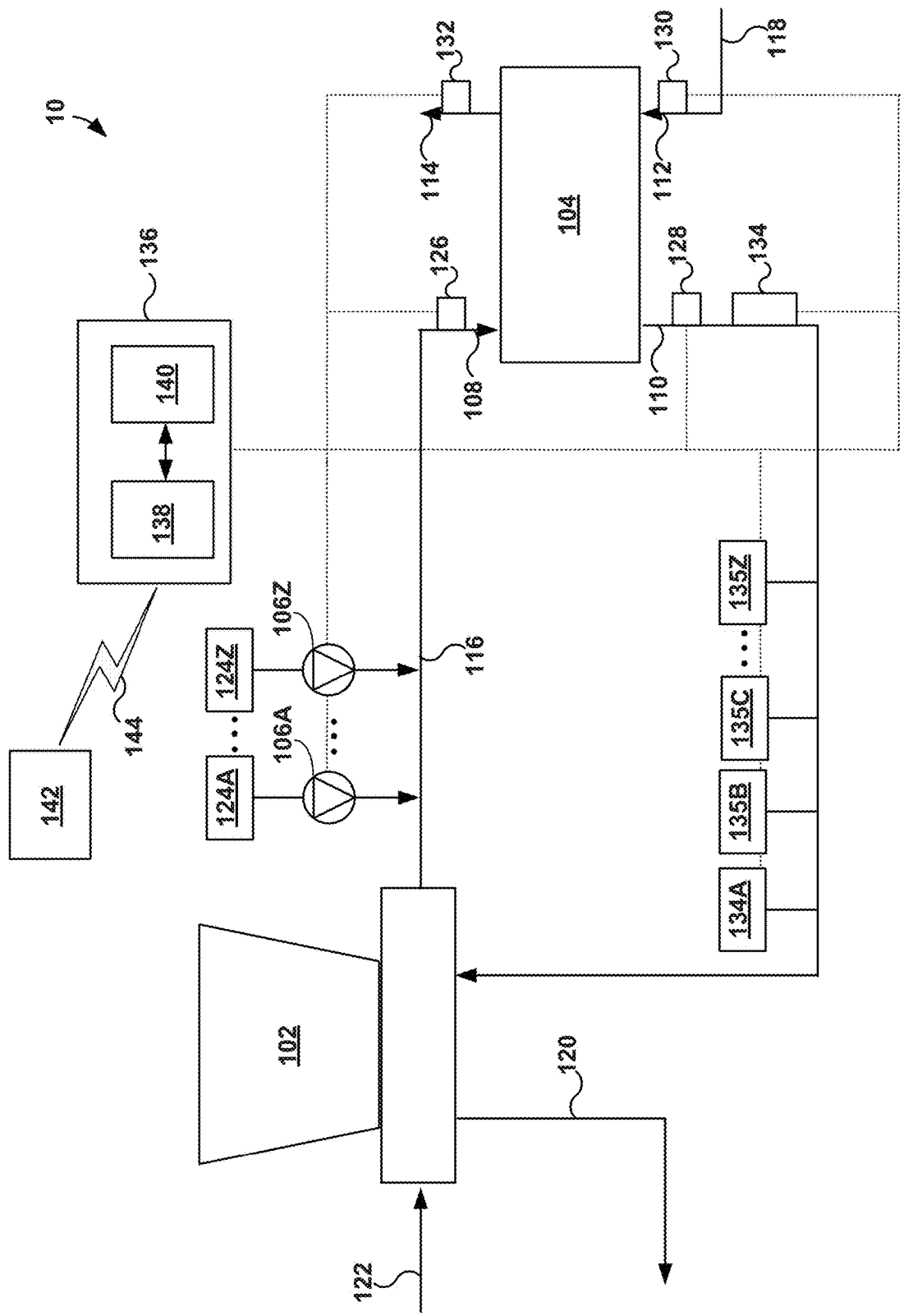
FIG. 2 is a conceptual diagram of an example cooling water monitoring and control system.

FIG. 2 is a conceptual diagram of an example cooling water monitoring and control system 10, which may be implemented for a heat exchanger 104 designated as being a critical heat exchanger according to a survey performed on a network of heat exchangers. In the illustrated example, system 10 includes a cooling tower 102, one or more heat exchanges 104, and a pump 106 that can introduce one or more chemical agents into a cooling water stream being recirculated through the heat exchange network. A controller 136 manages the overall operation of system 10. In operation, a comparatively hot process stream can pass through a process stream-side of heat exchanger 104 while a comparatively cold cooling water stream passes through a cooling water stream-side of the exchanger. The fluids may be separated by a solid wall surface within the heat exchanger to prevent mixing of the fluids. Thermal energy can transfer from the comparatively hot process stream to the comparatively cold cooling water stream, resulting in a reduction in the temperature of the process stream and an increase in the temperature of the cooling water stream. While the example system of FIG. 2 includes only a single heat exchanger 104 for purposes of illustration, a heat exchange network utilizing the concepts of the present disclosure may include multiple heat exchangers (e.g., each configured as heat exchanger 104 is described), as discussed above with respect to FIG. 1.

Heat exchanger 104 in the example of FIG. 2 includes a cooling water inlet 108 and a cooling water outlet 110. The heat exchanger also includes a process stream inlet 112 and process stream outlet 114. A cooling water stream 116 can enter heat exchanger 104 through the cooling water inlet 108, flow through one or more divided pathways inside of the heat exchanger, and exit the heat exchanger through the cooling water outlet 110. Likewise, a process stream 118 can enter heat exchanger 104 through the process stream inlet 112, flow through one or more divided pathways inside of the heat exchanger that are separated from the cooling water stream, and exit the heat exchanger through process stream outlet 114. In some configurations, the cooling water stream and the process stream flow in co-current directions through the heat exchanger. In other configurations, the cooling water stream in the process stream flow in countercurrent directions through the heat exchanger. In general, heat exchanger 104 can be implemented using any desired type of heat exchanger design, such as a shell and tube heat exchanger, a plate heat exchanger, or other type of thermal transfer device.

In the illustrated configuration, cooling water stream 116 is delivered to heat exchanger 104 from an upstream cooling tower 102 and recycled back to the cooling tower after passing through the heat exchanger. As indicated above, cooling water stream 116 may pass through one or more heat exchangers before entering heat exchanger 104 and/or through one or more heat exchangers after passing through heat exchanger 104 before returning to cooling tower 102. At cooling tower 102, thermal energy transferred to the cooling water stream flowing through the heat transfer circuit can be removed and discharged to atmosphere. For example, cooling tower 102 may bring the cooling water stream in direct contact with air, resulting in a reduction in the temperature the cooling water stream through evaporative cooling. The cooling water may be delivered to a sump or reservoir before being drawn out and passed through the heat exchange network.

In addition to water loss through evaporation, cooling water may be periodically removed from the heat exchange system. A discharge line 120 can be used to bleed-off (or "blow down") a portion of the sump or reservoir water while the system is operating. In any case, a "make-up" water line 122 can supply fresh water to the cooling system to make for water losses through evaporation or deliberate dumping.

In practice, a variety of issues may impact the thermal performance of heat exchanger 104 from the cooling water side of the heat exchanger. For example, if the cooling water contains a high level of solids (e.g., silt, debris) the solids may partially or fully plug the cooling water fluid pathway through heat exchanger 104. As an example, the cooling water may cause deposits to form on the internal surfaces of heat exchanger 104 contacted by the cooling water.

For example, the evaporation of cooling water can lead to the concentration of salts (e.g., calcium, sodium, magnesium) in the cooling water stream recycled through the system. These salts can form scaling deposits on surfaces of heat exchanger 104 contacted by the cooling water. As another example, if the cooling water contains organic materials and microbes, biofilms can deposit on surfaces of heat exchanger 104 contacted by the cooling water. As yet a further example, corrosion products can develop within the cooling water stream, e.g., due to the oxidation of metal component (e.g., iron, aluminum, and/or zinc). These corrosion products can also deposit on surfaces of heat exchanger 104 contacted by the cooling water. Independent of the mechanism or cause of the fouling, a build-up of a barrier layer on the surfaces of heat exchanger 104 contacted by the cooling water can reduce the efficacy of thermal transfer through the heat exchanger.

To help reduce or eliminate potential fouling conditions in the cooling water stream passing through the heat transfer network, one or more chemicals may be added to the cooling water to inhibit formation and/or deposition of foulants. In the configuration of FIG. 2, system 10 includes one or more pump 106A-106Z (collectively referred to as "pump 106") fluidly connected to one or more respective chemical additive reservoirs 124A-124Z (collectively referred to as "chemical reservoir 124"). Pump 106 can operate to add one or more chemicals to the cooling water that are selected to inhibit the formation and/or deposition of foulants on surfaces contacted by the cooling water. Example chemical additives that may be injected into the cooling water include, but are not limited to, polymers (dispersants and scale inhibitors), organophosphorus compounds such as phosphinosuccinic oligomer (PSO, scale and corrosion inhibitor), zinc (corrosion inhibitor), orthophosphate (corrosion inhibitor), polyphospahtes (scale and corrosion inhibitors), biocides, and combinations thereof. Additionally or alternatively, one or more chemical additives may be injected into the cooling water to adjust the pH of the cooling water. Examples of pH adjusting control agents include mineral acids, organic acids, and inorganic bases.

In the illustrated configuration of FIG. 2, pump 106 is illustrated as adding chemical additive to the cooling water between cooling tower 102 and heat exchanger 104. In practice, the chemical additive may be introduced to the cooling water stream at any suitable location, such as a sump associated with the cooling tower. Moreover, while system 10 in FIG. 2 illustrates a single pump 106 fluidly coupled to a single chemical additive reservoir 124, pump 106 may be in selective fluid communication with multiple reservoirs containing different chemicals and/or system 10 may include multiple pumps each configured to introduce a different chemical into the cooling water. By providing multiple different chemical additives, include some or all of those discussed above, the type of chemical introduced into the cooling water can be changed based on changing conditions of the cooling water.

To control the addition of chemical additive into the cooling water in system 10, the thermal performance of heat exchanger 104 may be monitored. The thermal performances of heat exchanger 104 may be monitored to evaluate the efficiency with which thermal energy is transferring from the comparatively hot process stream to the comparatively cold cooling water stream. The heat transfer efficiency of heat exchanger 104 may greatest when the heat exchanger is new or has undergone cleaning. For example heat exchanger 104 may be periodically cleaned using chemical and/or mechanical cleaning implements to remove fouling on the process and/or cooling side of the exchanger, providing heat exchange surfaces of the heat exchanger are clean and substantially or entirely unfouled. Over time in service, fouling deposits may build up on the process stream side and/or cooling water stream side of the heat exchanger heat transfer surfaces. As a result, the heat transfer efficiency of heat exchanger 104 may deteriorate during the course of service from one cleaning to the next cleaning.

To help monitor the heat transfer efficiency of heat exchanger 104, multiple sensors may be deployed to monitor different operational aspects of the heat exchanger. In the example of FIG. 2, system 10 includes a temperature sensor 126 that measures a temperature of cooling water stream 116 entering heat exchanger 104 and a temperature sensor 128 measuring a temperature of the cooling water stream exiting the heat exchanger. The system also includes a temperature sensor 130 measuring the temperature of the process stream 118 entering heat exchanger 104, and a temperature sensor 132 measuring the temperature the process stream exiting the heat exchanger. While the temperature sensors are illustrated schematically as being positioned immediately adjacent heat exchanger 104, the temperature sensors may be positioned at an upstream or downstream location from the heat exchanger, provide the temperature sensors provide a suitably accurate measure of the temperature of the respective stream entering or exiting the heat exchanger.

System 10 may include additional and/or different sensors to measure different operational parameters of heat exchanger 104. For example, the system may include one or more flow sensors to measure the flow rate of cooling water stream 116 and/or process stream 118. In the illustrated example, system 10 shows a flow sensor 134 positioned to measure a flow rate of the cooling water stream exiting heat exchanger 104. In other examples, the flow rates of the cooling water stream 116 and/or process stream 118 may be determined based on pump speeds or other information within the operating environment indicating the massive fluid conveyed through the heat exchanger. Other sensors that may be usefully employed in system 10 include pressure sensors (e.g., to measure a differential pressure of the cooling water stream and/or process stream across the heat exchanger).

In addition to monitoring characteristics of heat exchanger 104, system 10 can monitor online and/or receive data from offline analysis sources concerning the characteristics of cooling water flowing through the system, including heat exchanger 104. The data can provide information indicative of the potential fouling characteristic and corresponding fouling cause(s) on the cooling water-side of heat exchanger 104. This can be used in combination with heat transfer efficiency information from heat exchanger 104 to control the cooling water in system 10.

Typical causes of fouling that may be observed in practice include fouling caused by scale, fouling caused by corrosion, and/or fouling caused by biological sources (so called biofouling).

As used herein, the term "scale fouling" refers to fouling of a heat exchange surface by particulate matter from or formed in the cooling water including, but not limited to, constituents such as calcium carbonate, calcium phosphate, magnesium silicate, silica, manganese oxides, aluminum phosphates, silt, and sand.

The term "corrosion fouling" refers to fouling of a heat exchange surface by corrosion-formed deposits, such as primarily metal oxides, which may be formed in situ or by breakage and re-deposition from elsewhere in the system.

The term "biofouling" refers to fouling of a heat exchange surface by biological organisms, their extracellular molecules, or metabolic by-products.

To obtain information indicative of one or more potential fouling causes on the cooling water-side of heat exchanger 104, system 10 can generate and/or controller 136 can receive information associated with different potential fouling mechanisms. Each potential fouling mechanism may be associated with a single parameter being measured or may be associated with multiple parameters being measured, which collectively provide information on the likelihood that a potential fouling mechanism is the actual underlying fouling mechanism. For example, multiple different parameters associated with each potential fouling mechanism being evaluated in system 10 may be measured and collectively considered in determining whether the potential associate fouling mechanism is likely actually underline fouling mechanism.

To obtain data indicative of different fouling conditions in mechanisms within the cooling water flowing through heat exchanger 104, system 10 may include multiple different sensors 135A-135Z (collectively "sensor 135") providing information concerning the fouling conditions on the cooling water-side of heat exchanger 104. For example, in FIG. 2, system 10 is illustrated as having at least one sensor 135A providing information indicative of scale fouling on the cooling water side of heat exchanger 104, at least one sensor 135B providing information indicative of corrosion fouling on the cooling water side of the heat exchanger, and at least one sensor 135C providing information indicative of biofouling on the cooling water side of the heat exchanger.

Such sensors can be implemented in number of different ways in system 10. For example, one or more of the sensors can be positioned in line with cooling water flowing through heat exchanger 104 (e.g., upstream or downstream of the exchanger) either directly or via a slipstream pulled from the main cooling water stream. Alternatively, one or more of the sensors may be implemented as an off-line monitoring tool that is not in direct fluid communication with cooling water flowing through heat exchanger 104. In in these applications, cooling water flowing through heat exchanger 104 may be extracted from the system and transported to an off-line analysis system. Such off-line analysis may involve direct evaluation of the sample, e.g., using one or more sensors, or may involve further processing on the sample, such as performing wet chemistry processing on the sample to generate data associate with the sample. In either case, data generated by sensor 135 and/or otherwise associated with cooling water under evaluation can be received by controller 136, e.g., for storage in memory and/or further processing.

For example, the following table illustrates example cooling water data that may be obtained using online and/or offline monitoring techniques along with example capture frequencies for the data:

| Parameter | Frequency |
|---|---|
| Wet Chemistry Tests (Example Frequency) | |
| m-Alkalinity | Weekly |
| Total Hardness | Weekly |
| Suspended Hardness | Weekly |
| Calcium Hardness | Weekly |
| Magnesium Hardness | Weekly |
| Total Ortho Phosphate | Weekly |
| Soluble Ortho Phosphate | Weekly |
| Total Zinc | Weekly |
| Soluble Zinc | Weekly |
| Total Chlorine | Weekly |
| pH | Weekly |
| Traced Product Level (ppm) | Weekly |
| ORP | Weekly |
| Conductivity | Weekly |
| Nitrite | Weekly |
| Nitrate | Weekly |
| Dispersant Polymer | Weekly |
| Triazole | Weekly |
| Calcium Cycles | Weekly |
| Microbial Tests (Example Frequency) | |
| Aerobic Bacteria | Weekly |
| Anaerobic Bacteria | Weekly |
| Online Monitoring (Example Frequency) | |
| Temperature (° F.) | 5 minutes |
| Conductivity (µS/cm) | 5 minutes |
| pH | 5 minutes |
| ORP (mV) | 5 minutes |
| Steel Corr. Rate (mpy) | 5 minutes |
| Copper Corr. Rate (mpy) | 5 minutes |
| Traced Product Level (ppm) | 5 minutes |
| Dispersant Polymer Level (ppm) | 5 minutes |
| Turbidity (NTU) | 5 minutes |
| Background Channel (ppm) | 5 minutes |
| Cell Fouling (%) | 5 minutes |

Analysis data such as that exemplified in the forgoing table may entered into and/or stored in a computer-readable medium accessible by controller 136 for performing the analysis and control techniques described herein. It should be appreciated that the computing functionality attributed to controller 136 in system 100 may be performed on any one or more controllers associated with the system, be it physically onsite or remotely located, and the functionalities described herein are not limited to being performed on any specific hardware device or combination of hardware devices. Accordingly, the description of certain computing functionalities being performed on controller 136 is for purposes of discussion, and the disclosure is not limited in this respect.

To evaluate the likelihood that fouling conditions in system 10 are being caused by scale, controller 136 can receive data associated with a scale fouling mechanism. Sensor 135 in system 10 may generate, and controller 136 may receive, data concerning a concentration of phosphate in the cooling water, a concentration of calcium in the cooling water, a concentration of manganese in the cooling water, a concentration of aluminum in the cooling water, a concentration of iron in the cooling water, a concentration of phosphate in the cooling water, a concentration of alkalinity in the cooling water, and/or a concentration of silica in the cooling water. Increased concentrations of one or more of these components may be associated with an increased risk of scale fouling.

As another example, sensor 135 may be implemented using an optical sensor to provide a measurement indicative of a concentration and/or size of particles in the cooling water. For example, an optical sensor may be used to measure the turbidity and/or light scatting characteristics of the cooling water. An increased concentration of particulate in the cooling water may be associated with scaling fouling constituents, suggesting a scale fouling mechanism. Additionally or alternatively, an optical sensor may be used to measure fouling formation on a surface of the cooling water stream-side of heat exchanger 104 or an analogue thereof, such as a metal coupon or test strip exposed to the same cooling water conditions the heat exchanger is exposed to. The optical sensor may optically evaluate the foulant formed on the surface being monitored to determine the characteristics of the foulant and, correspondingly, whether the foulant is associated with a scale fouling mechanism (or corrosion or biofouling).

Controller 136 may receive additional or different data indicative of a potential scale fouling mechanism and use the information to control the cooling water system. As one example, controller 136 may receive data corresponding to pressure drop across heat exchanger 104 on the cooling water side and calculate a C-factor (thermal conductance factor) based on the pressure drop. A decrease in C-factor over time may include the formation of scale fouling.

To evaluate the likelihood that fouling conditions in system 10 are being caused by corrosion, controller 136 can receive data associated with a corrosion fouling mechanism. Sensor 135 in system 10 may generate, and controller 136 may receive, data concerning a concentration of iron in the cooling water and/or a concentration of copper in the cooling water. Increased concentrations of one or more of these components may be associated with corrosion fouling constituents. As another example, a linear polarization probe may be used to make resistance measurement indicative of corrosion conditions in the cooling water.

As still another example, an optical sensor may be used to measure fouling formation on a surface of the cooling water stream-side of heat exchanger 104 or an analogue thereof, such as a metal coupon or test strip exposed to the same cooling water conditions the heat exchanger is exposed to. The optical sensor may optically evaluate the foulant formed on the surface being monitored to determine the characteristics of the foulant and, correspondingly, whether the foulant is associated with a corrosion fouling mechanism. When an analogue is used to measure fouling conditions within system 10 rather than making direct measurements on a surface of the cooling water-side of heat exchanger 104, the analogue may or may not be formed of a same metallurgy as a metal defining the cooling water stream-side of the heat exchanger.

In one example configuration of system 10, a model or test heat exchanger may be used in conjunction with heat exchanger 104 to provide insights into the corrosion behavior occurring in heat exchanger 104. The model heat exchanger may be a different heat exchanger than the main heat exchanger 104 and may have a smaller capacity. A tube or coupon of metal functioning as an analogue to the cooling water-side of heat exchanger 104 can be placed within the housing. The model heat exchanger can be fluidly connected to the cooling water and/or process streams passing through heat exchange 104, e.g., by taking a slip stream(s).

To evaluate the likelihood that fouling conditions in system 10 are being caused by biofouling, controller 136 can receive data associated with a biofouling mechanism. Sensor 135 in system 10 may generate, and controller 136 may receive, data concerning a concentration of adenosine triphosphate in the cooling water, an amount of total organic carbon in the cooling water, and/or an oxidation-reduction potential of the cooling water. These constituents may be associated with biological activity in the cooling water that can cause biofouling.

Additionally or alternatively, an optical sensor may be used to measure fouling formation on a surface of the cooling water stream-side of heat exchanger 104 or an analogue thereof, such as a metal coupon or test strip exposed to the same cooling water conditions the heat exchanger is exposed to. The optical sensor may optically evaluate the foulant formed on the surface being monitored to determine the characteristics of the foulant and, correspondingly, whether the foulant is associated with a biofouling mechanism. As still another example, a fluorometer may be used to measure fluorescence caused by excitation of biological molecules in the cooling water, providing an indication of biological activity in the cooling water.

Controller 136 may receive additional or different data indicative of a potential scale fouling mechanism and use the information to control the cooling water system. As one example, controller 136 may receive data corresponding to a biological assay performed on the cooling water, such as an assay for planktonic and/or sessile activity. The results of the assay can provide a measure of the level of biological organisms in the cooling water and, correspondingly, the likelihood of a biofouling mechanism.

System 10 may include other sensors 135 provide information concerning the state of the cooling water in the system and a potential fouling mechanism occurring on the cooling water-side of the heat exchanger. For example, in addition to monitoring a temperature of the cooling water flowing through heat exchanger 104, a pH sensor may monitor a pH of the cooling water. As another example, in situations where a chemical additive is introduced into the cooling water stream to counteract a potential fouling cause, the additive may include a fluorescently tagged polymer or inert fluorescent tracer that can be fluorometrically analyzed to determine a concentration of the chemical in the cooling water. Controller 136 may evaluate the consumption rate of the chemical additive based on fluorometric response to help determine whether the detected cooling water fouling is associated with a fouling mechanism being treated or a potentially a different fouling mechanism.

System 10 in the example of FIG. 2 also includes controller 136. Controller 136 can be communicatively connected to the sensor components and controllable components of system 10 to manage the overall operation of the system. For example, controller 136 can be communicatively connected to pump 106, cooling water inlet temperature sensor 126, cooling water outlet temperature sensor 128, process stream inlet temperature sensor 130, process stream outlet temperature sensor 132, flow sensor 134, and sensors 135.

Controller 136 includes processor 138 and memory 140. Controller 136 communicates with communicatively connected components via a wired or wireless connection, which in the example of FIG. 2 is illustrated as a wired connection. Controls signals sent from controller 136 and received by the controller can travel over the connection. Memory 140 stores software for running controller 136 and may also store data generated or received by processor 138, e.g., from temperature sensors 126, 128, 130, 132, and flow sensor 134. Processor 138 runs software stored in memory 140 to manage the operation of system 10.

Controller 136 may be implemented using one or more controllers, which may be located at the facility site containing heat exchanger 104. Controller 136 may communicate with one or more remote computing devices 142 via a network 144. For example, controller 136 may communicate with a geographically distributed cloud computing network, which may perform any or all of the functions attributed to controller 136 in this disclosure.

Network 144 can be configured to couple one computing device to another computing device to enable the devices to communicate together. Network 144 may be enabled to employ any form of computer readable media for communicating information from one electronic device to another. Also, network 144 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one to another. Communication links within LANs may include twisted wire pair or coaxial cable, while communication links between networks may utilize analog telephone lines, full or fractional dedicated digital lines, Integrated Services Digital Networks (ISDNs), Digital Subscriber Lines (DSLs), wireless links including cellular and satellite links, or other communications links. Furthermore, remote computers and other related electronic devices may be remotely connected to either LANs or WANs via a modem and temporary telephone link.

In operation, temperature sensors 126, 128, 130, and 132 can generate data indicative of a temperature of a respective fluid stream entering or exiting heat exchanger 104. Likewise, flow sensor 134 can generate data indicative of a flow rate of cooling water exiting heat exchanger 104. Controller 136 can receive data from the sensors deployed throughout system 10 and use data generated by the sensors to determine a heat transfer efficiency of heat exchanger 104. With reference to information stored in memory relating received temperature information and/or flow rate information to heat transfer efficiency values, controller 136 can determine heat transfer efficiency values for the heat exchanger.

In some examples, controller 136 can determine the heat transfer efficiency of heat exchanger 104 using Equation (1) below:

$$U\text{-Value:} \frac{\dot{m} C_p \Delta T_{water}}{\Delta T_{LMTD} \times \text{Heat Tr. Area} \times F_t} \qquad \text{Equation 1}$$

In Equation (1) above, U-Value is the heat transfer efficiency, m is the mass flow rate of the cooling water stream, $C_p$ is the specific heat of the cooling water stream, $\Delta T_{water}$ is a difference between the temperature of the cooling water stream exiting the heat exchanger and the temperature of the cooling water stream entering a heat exchanger, Heat Tr. Area is an amount of surface area of the heat exchanger over which thermal energy is transferred between the process stream and the cooling water stream, $F_t$ is a correction factor corresponding to a geometry of the heat exchange and $\Delta T_{LMTD}$ is a log-mean temperature difference. Parameters such as the specific heat of the cooling water stream, the heat transfer area of heat exchanger 104, and a correction factor, may be stored in a memory and/or calculable based calculate information stored in memory. For example, a user may use a user input device to store information in memory 140 of controller 136 corresponding to the specific heat of the cooling water stream (e.g., the specific heat of water), and characteristics corresponding to the geometry of heat exchanger 104.

The log-mean temperature difference in Equation (1) above may be calculated using Equation (2) or (3) below.

$$\Delta T_{LMTD} = \frac{(T_{process,in} - t_{water,out}) - (T_{process,out} - t_{water,in})}{\log_e \frac{T_{process,in} - t_{water,out}}{T_{process,out} - t_{water,in}}} \qquad \text{Equation 2}$$

$$\Delta T_{LMTD} = \frac{(T_{process,in} - t_{water,in}) - (T_{process,out} - t_{water,out})}{\log_e \frac{T_{process,in} - t_{water,in}}{T_{process,out} - t_{water,out}}} \qquad \text{Equation 3}$$

Equation (2) may be used in circumstances where the cooling water stream and the process stream flow in a counter-current direction. Equation (3) may be used in circumstances where the cooling water stream and the process stream flow in a co-current direction. In both Equations (2) and (3), $T_{Process,in}$ is the temperature of the process water stream entering the heat exchanger as measured by temperature sensor 130, $T_{Process, out}$ is the temperature of the process stream exiting the heat exchanger as measured by temperature sensor 132, $t_{water,in}$ is the temperature of the cooling water stream entering the heat exchanger as measured by temperature sensor 126, and $t_{water, out}$ is the temperature of the cooling water stream exiting the heat exchanger, as measured by temperature sensor 128.

Controller 136 may receive data from the sensors in system 10 and determine the heat transfer efficiency of heat exchanger 104 continuously or on a periodic basis. For example, controller 136 may determine the heat transfer efficiency of heat exchanger 104 at least once per day, such as at least once per hour, at least once per minute, or at least once per second. The frequency with which controller 136 calculates the heat transfer efficiency of heat exchanger 104 may vary depending on the sampling rate of the sensors in system 10, the processing capacity of controller 136, and/or an operator input selecting the frequency with which the heat transfer efficiency should be calculated.

In practice, it is desirable if heat exchanger 104 exhibits a high heat transfer efficiency that remains high (e.g., substantially constant) during the service interval of the heat exchanger. In practice, however, the heat transfer efficiency of heat exchanger 104 may decrease over time is fouling builds up on the process stream side of the heat exchanger and/or on the cooling water side of the heat exchanger. By monitoring the rate at which fouling builds up on the heat exchanger and the corresponding rate at which the thermal efficiency changes for the heat exchanger, interventional action may be taken on the cooling water side by controlling pump 106 to control the addition of one or more chemical additives to the cooling water stream in response to detecting changes in thermal efficiency.

In some examples, controller 136 establishes a heat transfer efficiency trend for heat exchanger 104 over a period of time. The period of time over which the heat transfer efficiency trend is established may begin when the heat exchanger is first placed in service (e.g., is new or following cleaning). This is when heat exchanger 104 is least likely to be fouled. Alternatively, the period of time over which the heat transfer efficiency trend is established may begin after the heat exchanger has been placed in service for a period of time. For example, the heat transfer efficiency trend may be begin when changes are made to the cooling water stream (e.g., following blow down) and/or changes are made to the process stream (e.g., change in temperature, pressure, composition) flowing through heat exchanger 104.

Independent of when the period of time for measuring the heat transfer efficiency trend for heat exchanger 104 begins, controller 136 may measure the heat transfer efficiency for a period of time effective to provide a statistically reasonable trend of the heat transfer efficiency behavior. For example, controller 136 may measure the heat transfer efficiency of heat exchanger 104 for at least 1 day, such as at least 5 days, at least 10 days, at least 20 days, or at least 30 days. In some examples, controller 136 measures the heat transfer efficiency of heat exchanger 104 for a period of time ranging from 1 day to 120 days, such as from 5 days to 100 days, from 10 days to 45 days, or from 5 days to 30 days. In some examples, controller 136 measures the heat transfer efficiency as a rolling average over a certain number of preceding days, such as a proceeding period ranging from 5 days to 50 days.

Controller 136 can generate heat transfer efficiency values based on sensor information received during the period of measurement. Controller 136 can further perform statistical trend analysis on the heat transfer efficiency values determined during the period of measurement to identify a trend for the heat transfer efficiency of heat exchanger 104.

In some examples, controller 136 may fit a curve to heat transfer efficiency values plotted on a y-axis of a graph with corresponding measurement time plotted on the x-axis of the graph. In one example, the curve is a first order equation having the form $y=m*x+b$, where y is the heat transfer efficiency, x is the time, m is the slope of the curve, and b is the intercept of the curve. The slope of the curve "m" can be stored in a memory associated with controller 136 as a trend corresponding to heat transfer efficiency of heat exchanger 104. In other examples, a higher order polynomial curve may be fit to the data.

In some examples, controller 136 processes the temperature data received from sensors 126, 128, 130, and 132 and/or flow data received from sensor 134 prior to calculating the heat transfer efficiency. For example, controller 136 may smooth the data using a statistical smoothing algorithm to remove noise and outliers from the data. Controller 136 may then determine the heat transfer efficiency using smoothed temperature values. Alternatively, controller 136 may calculate heat transfer efficiency values for the raw data and apply the smoothing algorithm to the calculated heat transfer efficiency values. Subsequent trend analysis and change detection may be performed using the smoothed data.

Controller 136 can continue receiving measurements from the sensors in system 10 and generating heat transfer efficiency values based on the received sensor data after establishing a heat transfer efficiency trend. Controller 136 can compare heat transfer efficiency information for heat exchanger 104 to the heat transfer efficiency trend determined for the heat exchanger and detect if there is a change in the heat transfer efficiency trend. For example, controller 136 may determine a heat transfer efficiency trend for a measurement period and compare that trend to the earlier-established trend. The measurement period can be comparatively short (e.g., a day or less) or longer (e.g., a day or more, such as a week or more). In applications where controller 136 fits a first order equation to the heat transfer efficiency data calculated based on data received from heat exchanger 104, the controller may determine a slope of the heat transfer efficiency during the measurement period. Controller 136 may compare the slope of the heat transfer efficiency trend of heat exchanger 104 during the measurement period (comparison period) to the slope of the earlier-established heat transfer efficiency trend (baseline period).

A variety of different indicators may be used to divide a data set of heat transfer efficiency data into a baseline period and a comparison period for purposes of relative comparison and quantification of trend change. In some example, heat transfer efficiency data is split based on an event impacting the operation of system 10 into a baseline period before the event and a comparison period after the event. Example events include: plant shutdown and startup (e.g., turnaround), the changing of a piece of equipment the cooling water contacts (e.g., pump, heat exchanger), a water chemistry upset in the cooling tower water and/or associated chemical feeds (e.g., a change in the concentration of a chemical species in the water greater than 10%, such as greater than 20%, greater than 50%, or greater than 100%), a change in operating temperature, a change in process stream composition or conditions, and combinations thereof. The heat transfer efficiency trend data before the event can form the baseline period, and the heat transfer efficiency trend data after the event can form the comparison period. Controller 136 may be informed of the event through user input via a user interface or other monitored data received by the controller indicating the occurrence of the event.

As another example, controller 136 can establish a moving average (e.g., having a period ranging between 10 days and 3 months) of heat transfer efficiency trend data as a baseline and compare later heat transfer efficiency trend data to the moving average to provide the comparison. As yet a further example, controller 136 can divide monitored heat transfer efficiency data into two periods (e.g., a baseline period and a comparison period) based on duration and compare the two periods to each other. For example, controller 136 can divide monitored heat transfer efficiency data into a baseline period generated over a baseline duration and a comparison period generated over a comparison duration. The baseline duration and comparison duration may be the same as or different than each other. In some examples, the baseline duration and comparison duration each range from a length of one week of monitored heat transfer efficiency trend data to 6 months of monitored heat transfer efficiency trend data, such as from 2 weeks of monitored heat transfer efficiency trend data to 4 months of monitored heat transfer efficiency trend data, or from 1 month of monitored heat transfer efficiency trend data to 3 months of monitored heat transfer efficiency trend data.

Independent of the technique used by controller 136 to divide data corresponding to heat transfer efficiency into a baseline period and a comparison period, in some applications, controller 136 compares the change in heat transfer efficiency over the two periods to each other. For example, controller 136 may determine a percent change in the heat transfer efficiency over the baseline period and the comparison period by comparing the slopes of fitted trend lines for each period.

As the duration or length of the baseline period may be different than the comparison period, controller 136 may normalize the calculated heat transfer efficiency change over each period to a standardized duration. For example, controller 136 may adjust (e.g., linearly extrapolate) the calculated change to an annualized (12 month) period or period of other duration. By way of illustration, where the duration of the baseline period is 3 months, controller 136 can multiply the calculated heat transfer efficiency change for the baseline period by 4 to annualize the change to a 12 month basis.

Controller 136 can compare the heat transfer efficiency trend from the baseline period to the heat transfer efficiency trend for the comparison period. Controller 136 may perform the comparison by comparing the time-adjusted (e.g., annualized) change in heat transfer efficiency over the baseline period to the time-adjusted change in heat transfer efficiency over the comparison period. In different examples, controller 136 may calculate a difference between the two values (e.g., by subtracting the time-adjusted change in heat transfer efficiency over the baseline period to the time-adjusted change in heat transfer efficiency over the comparison period), a ratio of the two values, or other parameter representing a comparison between the two values.

Controller 136 may determine if the heat transfer efficiency trend during the measurement period differs from the earlier-established heat transfer efficiency trend by more than a threshold amount. The threshold amount may be greater than or equal to 1% of the earlier-established heat transfer efficiency value (e.g., slope), such as greater than or equal to 5% of the earlier-established heat transfer efficiency value, greater than or equal to 10% of the earlier-established heat transfer efficiency value, greater than or equal to 25% of the earlier-established heat transfer efficiency value, or greater than or equal to 50% of the earlier-established heat transfer efficiency value. For example, the threshold amount may range from 1 percent to 50 percent of the earlier-established heat transfer efficiency value, such as from 2 percent to 25 percent, or from 5 percent to 20 percent.

Where controller 36 determines a parameter representing a comparison of heat transfer efficiency over two periods—for example, a difference between a time-adjusted change in heat transfer efficiency over a baseline period to a time-adjusted change in heat transfer efficiency over a comparison period—the threshold may be one or more discrete values rather than a percentage. When the parameter is a difference in annualized U-value (e.g., the change in annualized U-value over comparison period minus the change in annualized U-value over the baseline period), the threshold value may be zero or less BTU/hr/ft2/degF per year, such as −10 or less BTU/hr/ft2/degF per year, −25 or less BTU/hr/ft2/degF per year.

If the heat transfer efficiency trend is deviating negatively from the earlier-established heat transfer efficiency trend, it may be indicative that the heat exchanger is fouling faster during the measurement period than during earlier operation. If left untreated, the more rapid fouling may reduce the operating efficiency of heat exchanger 104, potentially necessitating costly and unplanned shutdown to clean the exchanger before the next scheduled cleaning. For example, when the parameter corresponding to comparison between the two monitored time periods is determined to be at or below the threshold, controller 136 may determine that problematic cooling water fouling is likely occurring. By contrast, if the parameter is determined to be above the threshold, controller 136 may determine that problematic cooling water fouling is likely not occurring.

To help respond to the detected change in heat transfer efficiency trend, controller 136 can determine a predicted cause of the change in heat transfer efficiency trend and control the cooling water system based on the predicted cause. Controller 136 may determine a predicted cause of the change in heat transfer efficiency trend based on the data received corresponding to different potential fouling causes on the cooling water-side of heat exchanger 140. For example, controller 136 may receive data corresponding to a potential scale fouling root cause, a potential corrosion fouling root cause, and data corresponding to a biofouling root cause. From the different received data, controller 136 can determine a predicted or most likely fouling cause from the different causes being evaluated based on the received data. Controller 136 can then control cooling water system 10 based on the predicted fouling cause.

In some examples, controller 136 applies a weighting factor to each data parameter received that corresponds to the different types of fouling mechanisms being evaluated to determine a lead or predicted fouling cause. Each weighting factor can correspond to the predictive strength and probative value a particular data parameter has on determining the underlying root cause of a cooling water-side fouling problem. A particular weighting factor may be determined based on causal analysis of empirical data relating a particular parameter to a particular fouling mechanism. The weighting factor may be further adjusted upwardly or downwardly based on application-specific factors related to the particular cooling water process being monitored and controlled. Controller 136 may determine the weighting factors to be used for each particular data parameter, or the weighting factors may programmed into a memory associated with controller 136 and used by the controller to determine a predicted cause of fouling associated with the detected change in heat transfer efficiency trend.

Although the specific weighting factors applied by controller 136 can vary based on the application, Tables 1, 2, and 3 provide ranges of exemplary weighting factors that may be applied to different parameters that can be associated with different types of fouling mechanisms. In the table, percentage of baseline refers to the parameter as measured after detecting a change in heat transfer efficiency (e.g., increase in fouling rate) as compared to the parameter as measured during a low fouling rate (e.g., baseline) operating conditions. Likewise, percentage of KPI (key performance indicator) refers to the value for the parameter as measured after detecting a change in heat transfer efficiency (e.g., in a fouled state) as compared to the target value for the parameter for target system (e.g., baseline) operating conditions. Further, it should be appreciated that the fouling parameters listed in the foregoing tables are examples and the disclosure is not limited in this respect.

TABLE 1

Example parameters corresponding to scale fouling and associated example weighting factors.

| Scale Fouling Parameter | Number | Weight |
|---|---|---|
| Optical Fouling Measurement of Surface | % > Baseline | 0.5 to 4 |
| Turbidity | % > Baseline | 0.25 to 1 |
| Light Scattering | % > Baseline | 0.25 to 1 |
| Temperature | % > Baseline | 0.5 to 4 |
| pH | % > Baseline | 0.5 to 4 |
| PO4 Concentration | % > Baseline | 0.5 to 2 |
| Ca Concentration | % > Baseline | 0.25 to 1 |
| Mg Concentration | % > Baseline | 0.25 to 1 |
| Al Concentration | % > KPI | 0.5 to 2 |
| Mn Concentration | % > KPI | 0.5 to 2 |
| Fe Concentration | % > KPI | 0.5 to 2 |
| Silica Concentration | % > Baseline | 0.5 to 2 |
| Alkalinity Concentration | % > Baseline | 0.25 to 4 |
| Water Treatment Chemical Conc. | % < Baseline | 0.5 to 2 |
| Water-side C Factor | % > Baseline | 0.5 to 2 |
| Dispersant Polymer Consumption | % > Baseline | 0.5 to 2 |
| Cooling Water Treatment Feed Rates | % > Baseline | 0.5 to 4 |

TABLE 2

Example parameters corresponding to corrosion fouling and associated example weighting factors.

| Corrosion Fouling Parameter | Number | Weight |
| --- | --- | --- |
| Linear Polarization Measurements | % > KPI | 0.5 to 2 |
| Pitting Index | % > KPI | 0.5 to 2 |
| Optical Corrosion Measurements | % > Baseline | 0.25 to 1 |
| Coupon Corrosion Rate | % > KPI | 0.5 to 2 |
| Localized Coupon Penetration | % > KPI | 0.5 to 2 |
| Temperature | % > Baseline | 0.25 to 1 |
| pH | % < Baseline | 0.5 to 4 |
| Iron Concentration | % > KPI | 0.5 to 4 |
| Copper Concentration | % > KPI | 0.5 to 2 |
| Water Treatment Chemical Conc. | % < KPI | 0.5 to 2 |

TABLE 3

Example parameters corresponding to biofouling and associated example weighting factors.

| State of Microbial Control Indicators | Number | Weight |
| --- | --- | --- |
| Fouling of Test Surfaces (microbe sensor) | % > Baseline | 0.5 to 4 |
| Turbidity | % > Baseline | 0.25 to 1 |
| Light Scattering | % > Baseline | 0.25 to 1 |
| Fluorescently Observed Microbial Activity | % > Baseline | 0.5 to 4 |
| ATP Sensing | % > Baseline | 0.5 to 2 |
| Planktonic Assay Methods | % > KPI | 0.5 to 4 |
| Sessile Assay Methods | % > KPI | 0.5 to 4 |
| Ambient Temperature | % > Baseline | 0.25 to 1 |
| TOC Concentration | % > KPI | 0.5 to 2 |
| Oxidant Residual Levels | % < KPI | 0.5 to 4 |
| Oxygen Residual Levels | % < KPI | 0.25 to 1 |
| Oxidation Reduction Potential | % < Baseline | 0.5 to 4 |
| Amperometric Measurements | % < Baseline | 0.5 to 4 |
| Decay time of oxidant residuals | % > Baseline | 0.5 to 2 |
| Oxidant Consumption | % > Baseline | 0.5 to 4 |
| Concentration Ratio of Fluorescent Bioactivity Probes | % > Baseline | 0.5 to 2 |
| Cooling Water Treatment Feed Rates | % < Baseline | 0.5 to 4 |

Controller 136 can apply a weighting factor by multiplying a respective data parameter by its corresponding weighting factor. Depending on the number of data points available for a particular parameter, controller 136 may average multiple measurements of the parameter and apply the weighting factor to an averaged value of the parameter. For example, controller 136 may determine a mean, median, or mode of the multiple data points to provide an average of the parameter, and then apply the weighting factor to the averaged parameter. The period over which the measured parameters being averaged are taken may begin upon detecting the change in heat transfer efficiency trend for heat exchanger 104. The change in heat transfer efficiency trend may signal a change in cooling water conditions corresponding to changing fouling conditions. Accordingly, measurements made prior to detecting the change in heat transfer efficiency trend may be omitted in some case where the data may not be reflective of the changed conditions of the cooling water.

To identify a predicted cause of potential fouling that may be causing the detected change in the heat transfer efficiency trend, controller 136 may determine an aggregate fouling score for each fouling mechanism being evaluated as a potential root cause. Controller 136 may determine the aggregate fouling score by summing the weighted parameter associated with a parameter fouling mechanism. For example, controller 136 may determine an aggregate scale fouling score by summing each weighted data parameter indicative of scale fouling. Controller 136 may determine an aggregate corrosion fouling score by summing each weighted data parameter indicative of corrosion fouling. Further, controller 136 may determine an aggregate biofouling score by summing each weighted data parameter indicative of biofouling.

In practice, the number of data parameters associated with each type of fouling being evaluated as a root cause of the detected change in heat transfer efficiency may vary. For example, the number of parameters measured corresponding to a potential scale fouling cause may be different than the number of parameters measured corresponding to a potential corrosion fouling cause, each of which may be the same as or different than the number of parameters measured corresponding to a potential biofouling cause. In situation where this discrepancy exists, the summed total of the weighted parameters corresponding to each type of fouling mechanism may be normalized based on the number of parameters. For example, controller 136 may divide the summed total of the weighted parameters corresponding to each type of fouling mechanism by the number of parameters. This can provide an aggregate fouling score for each type of potential fouling mechanism being evaluated that is normalized to allow cross-comparison between the different fouling scores.

Controller 136 can determine a predicted cause of fouling attributable to the detected change in heat transfer efficiency trend by comparing the aggregate fouling score for each type of potential fouling mechanism to each other. For example, depending on how the weighting factors are scaled, controller 136 may identify a smallest (minimum) or largest (maximum) one of the aggregate fouling scores. Controller 136 may then establish a fouling cause associated with the identified aggregate fouling score as the predicted cause of the detected change in heat transfer efficiency. Controller 136 can then control one more chemical additives introduced into the cooling water system based on the predicted cause.

In some examples, controller 136 compares each of the aggregate fouling scores corresponding to different potential fouling mechanisms to one or more threshold values. Controller 136 may determine a predicted cause of fouling—or that fouling is not likely occurring—based on the comparison. The specific threshold value(s) against which controller 136 compares each of the aggregate fouling scores may vary, e.g., based on the magnitude of the weighting factors applied. However, in some applications, controller 136 compares each of the aggregate fouling scores against a first threshold, such as a first threshold of 0.25. This threshold value can vary depending on the magnitude of the weighting factors used and the fouling tolerances of the user implementing the systems. Independent of the specific value used, if an aggregate fouling score is below the first threshold, controller 136 may indicate that the fouling mechanism associated with the fouling score is unlikely to causing fouling and no action is needed. For example, where the heat exchanger is blocked with loose debris in the cooling water unrelated to fouling, comparison of the aggregate fouling scores to the threshold may reveal that corresponding change in heat transfer efficiency trend is not caused by scale, corrosion, or microbial fouling.

Additionally or alternatively, controller 136 may compare each of the aggregate fouling scores against a second threshold. The second threshold may vary from the first threshold by a factor of at least 2. In some examples, the second threshold is greater than the first threshold. For instance, in an example where the first threshold is 0.25, the second threshold may be 0.5. Again, though, different threshold values may be used depending on the specific weighting factors applied to the data. If an aggregate fouling score is above the second threshold, controller 136 may indicate that the fouling mechanism associated with the fouling score is like causing fouling and remedial action is needed. If the aggregate fouling score is between the two thresholds, the controller may issue warning to a user interface (e.g., with or without taking action), indicating that close monitoring of potential fouling is needed.

Controller 136 may control system 10 based on the predicted fouling cause by taking actions to counteract the predicted fouling cause. As one example, controller 136 may control system 10 to blow down cooling tower 102. As another example, controller 136 may control system 10 by controlling addition of a chemical additive selected to counteract the predicted fouling cause. For example, where the predicted cause is scale fouling, controller 136 may control addition of a scale inhibitor and/or pH control agent to inhibit scale fouling formatting in the system. As another example, where the predicted cause is corrosion fouling, controller 136 may control addition of a corrosion inhibitor and/or pH control agent to inhibit corrosion fouling in the system. As still another example, where the predicted cause is biofouling, controller 136 may control addition of a biocide and/or biodispersant to inhibit biofouling in the system.

While the foregoing remedial actions are described as being performed by controller 136, it should be appreciated that operator intervention may or may not be needed to perform some or all of the actions. For example, in practice, controller 136 may issue a user alert (e.g., visual text and/or graphics) on a computer user interface providing control instructions and/or a recommended course of action for addressing a predicted fouling cause. An operator may interact with plant equipment—either manually or through a controller interface (e.g., computer) controlling the plant equipment—to implement the desired actions counteracting the predicted fouling cause.

In applications where there are multiple different chemical additives available for introduction into the cooling water, controller 136 may select one or more of the different chemical additives to be introduced into the cooling water by controlling valve(s) and/or pump(s) fluidly coupling the one or more different chemical additives to the cooling water stream. For example, controller 136 may vary the type of chemical additive introduced into the cooling water and/or the rate at which the chemical additive is introduced into the cooling water based on the detected change in heat transfer efficiency trend and predicted fouling cause.

In some examples, controller 136 starts pump 106 or increases the operating rate of pump 106 in response to detecting a change indicating that the heat transfer efficiency trend for heat exchanger 104 has decreased by more than a threshold amount compared to the earlier-established heat transfer efficiency trend and based on the predicted fouling cause. Additionally or alternatively, controller 136 may stop pump 106 or decrease the operating rate of pump 106 in response to detecting the change and based on the predicted fouling cause (e.g., where the chemical being introduced into the system may increase to the predicted fouling cause).

Controller 136 can continue receiving data from the sensors in system 10 and calculating a heat transfer efficiency for heat exchanger 104 after controlling the system (e.g., adjusting a chemical additive introduced into the cooling water) based on the predicted fouling cause. Controller 136 may monitor the heat transfer efficiency trend for heat exchanger 104 following changes made to the chemical additive(s) (e.g., type and/or rate). Controller 136 may determine if the heat transfer efficiency stabilizes (e.g., remains substantially constant), returns toward the previously-established trend, or deviates further from the previously-established trend. In applications where the heat transfer efficiency trend remains constant after taking counteracting action—which can correspond to a negative deviation initially detected—or the trend decreases further, controller 136 may determine that the predicted fouling cause is not the likely actual cause. For example, controller 136 may monitor the heat transfer efficiency trend after taking counteracting action to address the predicted fouling cause and determine if the trend changed by more than a threshold amount (e.g., greater than plus or minus 5%, such as greater than plus or minus 10%). In cases where fouling continues to exists in process continues, the trend may remain negative but be at a different (shallower or lower) slope than prior to taking interventional action.

In such applications, controller 136 may determine an alternative predicted cause of the detected change in the heat transfer efficiency trend. Controller 136 may determine an alternative predicted cause of the fouling be comparing the aggregate fouling score associated with the remaining potential fouling mechanisms (e.g., excluding the aggregate fouling score for the fouling mechanism already identified as the predicted fouling cause). Depending on how the weighting factors are scaled, controller 136 may identify a smallest (minimum) or largest (maximum) one of the remaining aggregate fouling scores and establish a fouling cause associated with the identified aggregate fouling score as the alternative predicted cause of the detected change in heat transfer efficiency. Controller 136 can then control one more chemical additives introduced into the cooling water system based on the alternative predicted fouling cause.

Controller 136 can monitor the heat transfer efficiency trend in response to the actions taken to counteract the alternative predicted fouling cause. Controller 136 may repeat the process until a predicted fouling cause is identified that appears to be the root cause of the change in heat transfer efficiency trend originally detected. Additionally or alternatively, controller 136 may issue an output (e.g., user alert) indicating that the detected change in heat transfer efficiency trend is likely not associated with cooling water-side fouling (e.g., caused by scale fouling, corrosion fouling, or biofouling). For example, the change in heat transfer efficiency trend may be caused by bulk debris entering heat exchanger 104 and plugging the exchanger. As another alternative, the detected change in heat transfer efficiency trend may be caused by process-side fouling on heat exchanger 104 and not cooling water-side fouling.

Controller 136 may take a variety of different control actions within system 10 in addition to or in lieu of controlling pump 106 to change a type or concentration of chemical additive in the cooling water. As one example, controller 136 may increase the rate at which cooling water flows through heat exchanger 104 in response to detecting a change in the heat transfer efficiency trend for the heat exchanger. For example, if controller 136 detects a sudden change in the absolute magnitude of the heat transfer efficiency of heat exchanger 104 and/or a significant decrease in the heat transfer efficiency trend (e.g., indicating rapid fouling), that may be indicative of heat exchanger plugging due to silt, debris, or other matter. Accordingly, increasing the flow rate of cooling water passing through the exchanger may help flush particulate matter lodged within the heat exchanger. Controller 136 may control a pump (not illustrated) supplying cooling water from a sump associated with cooling tower 102 to heat exchanger 104 to control the flow rate of cooling water supply to the heat exchanger.

A cooling water monitoring and control system according to the disclosure can be implemented in any process where a thermal exchange fluid is used to transfer thermal energy with one or more process streams through a heat exchanger. Example process streams that may flow through the hot side of heat exchanger 104 include, but are not limited to, organic-based chemicals, crude oil, derivatives of crude oil (e.g., refined or partially refined crude oil products), and intermediary or final products in an ammonia production process. For example, the heat exchanger may be integrated in a polymer production plant organic monomer, oligomer, and/or polymer flows through the process side of the heat exchanger. As another example, the heat exchanger may be integrated into a power plant that generates electricity from a renewable or non-renewable source. The process streams flowing through the hot side of heat exchanger 104 may generally be liquid phase, although may be vapor phase, and/or a liquid-vapor multi-phase stream. For example, heat exchanger 104 may be integrated into an air separation plant such that a process stream on the process stream-side of the heat exchanger is a gas.

Although FIG. 2 illustrates an example monitoring and control system containing a single heat exchanger, as discussed above with respect to FIG. 1, example applications may include multiple heat exchangers in series and/or in parallel. Controller 136 can receive data from the sensors and determine a heat transfer efficiency trend for each of the connected heat exchangers. Controller 136 can detect a change in the heat transfer efficiency trend of at least one, and optionally multiple, of the heat exchangers being monitored and control addition of the chemical additive to the cooling water stream based on the detected trend. In some such examples, controller 136 may determine a predicted fouling cause and control cooling water system 10 based on the predicted fouling cause upon detecting a change in the heat transfer efficiency trend (e.g., exceeding a threshold amount) of multiple of the heat exchangers. In this case, the detection of changed heat transfer efficiency trends for multiple heat exchangers may indicate the fouling conditions are actually changing as opposed to receiving errant sensor data from one particular heat exchanger.

Figure 3:
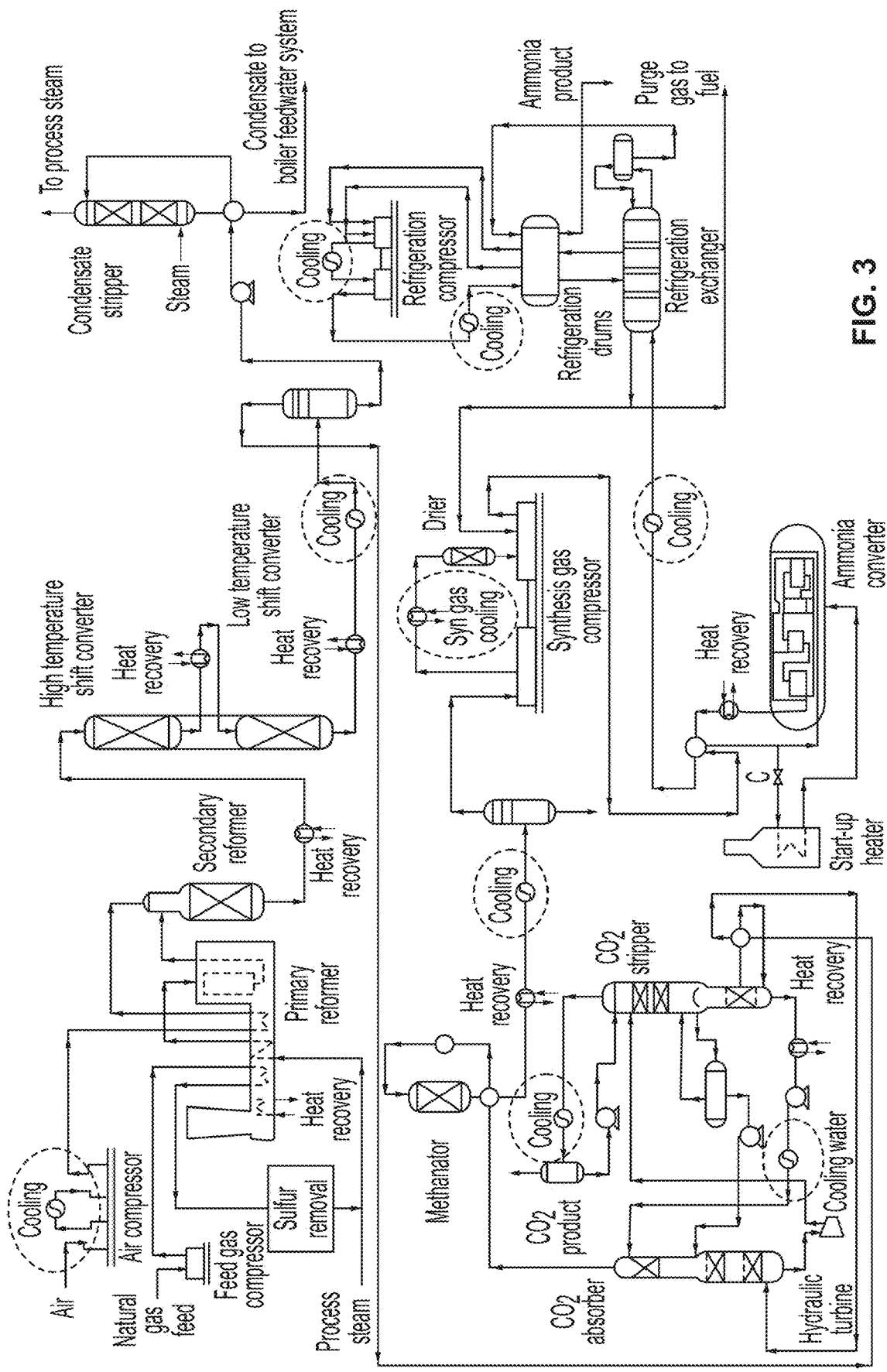
FIG. 3 is a flow diagram illustrating an example ammonia production process in which a cooling water monitoring and control system according to FIG. 2 may be implemented.

FIG. 3 is a flow diagram illustrating an example ammonia production process. As shown in the illustrated example, the example process includes multiple cooling heat exchangers through which cooling water may be conveyed. One or more (e.g., all) of these example heat exchangers may be monitored using the techniques and systems described herein, and chemical additive to the cooling water stream controlled based on the heat exchanger efficiency trends.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

The following examples may provide additional details about cooling water monitoring and control systems and techniques according to the disclosure.

EXAMPLES

Example 1—Ammonia Plant

Temperature sensors were installed on a heat exchanger in an ammonia plant to measure the inlet and outlet temperatures of the flow streams to the heat exchanger as well as the flow rate of cooling water through the inlet of the heat exchanger. The heat exchanger was a syngas cooler that passed syngas through the hot or process side of the heat exchanger while cooling water flowed through the cold side of the heat exchanger. The heat exchanger was a counter-current shell-and-tube exchanger. The syngas was supplied to the shell side of the heat exchanger at a target flow rate of approximately 99,000 lb/hr, while the cooling water was supplied at a target flow rate of approximately 1,000,000 lb/hr.

The cooling water was supplied from a cooling tower that had a recirculation rate of approximately 80,000 gallons/minute. The cooling tower had a capacity of approximately 500,000 gallons and exhibited a temperature differential of 12 degrees Fahrenheit. The cooling water exhibited a FRC of 0.5 ppm as $Cl_2$. The cooling water was initially controlled with a combination of three chemical additives: a corrosion inhibitor (Nalco® 3DT129) provided at a concentration of 35 ppm, a scale inhibitor (Nalco® 3DT191) provided at a concentration of 75 ppm, and a yellow metal inhibitor (Nalco® 3DT199) provided at a concentration of 10 ppm.

The data from the four temperature sensors and an ultrasonic flow sensor were communicated by wired connection to a third part data logger. The data logger wirelessly transmitted this raw data to a cloud server. From the cloud server, the data was accessed and analyzed on a personal computer using spreadsheet software.

Figure 4:
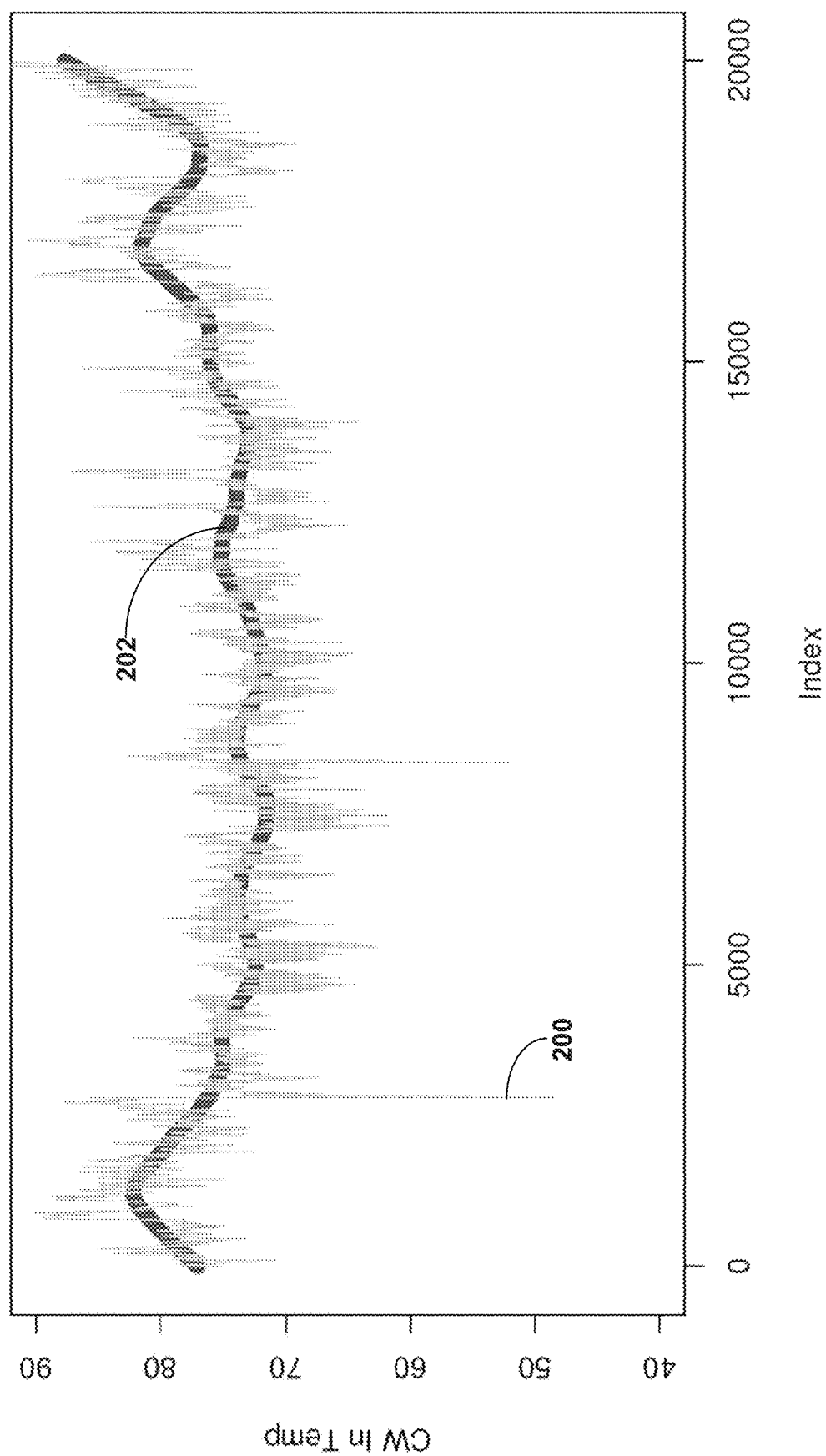
FIGS. 4-7 show example raw and smoothed temperature data for flow streams on a heat exchanger.
Figure 5:
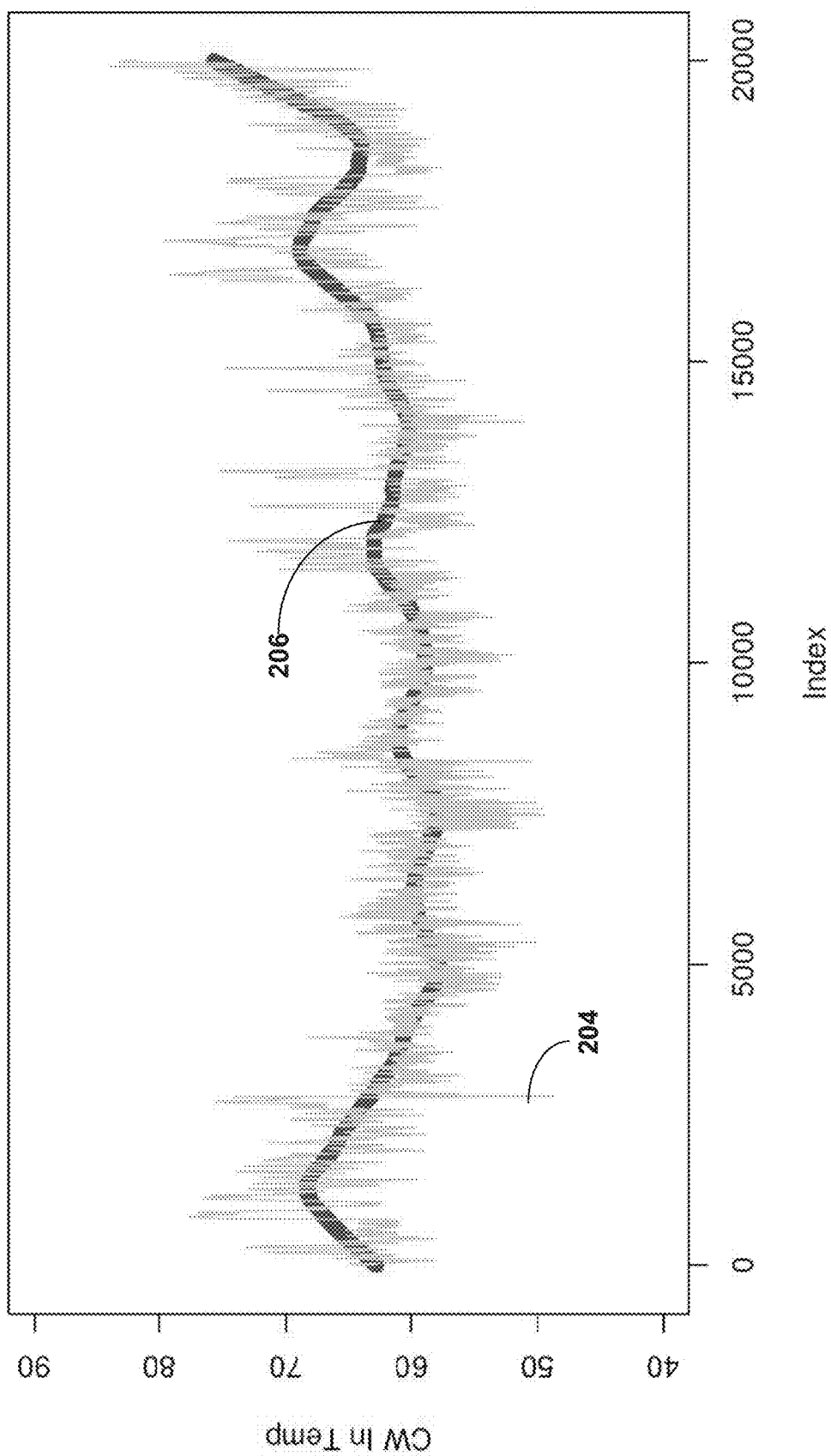
Figure 6:
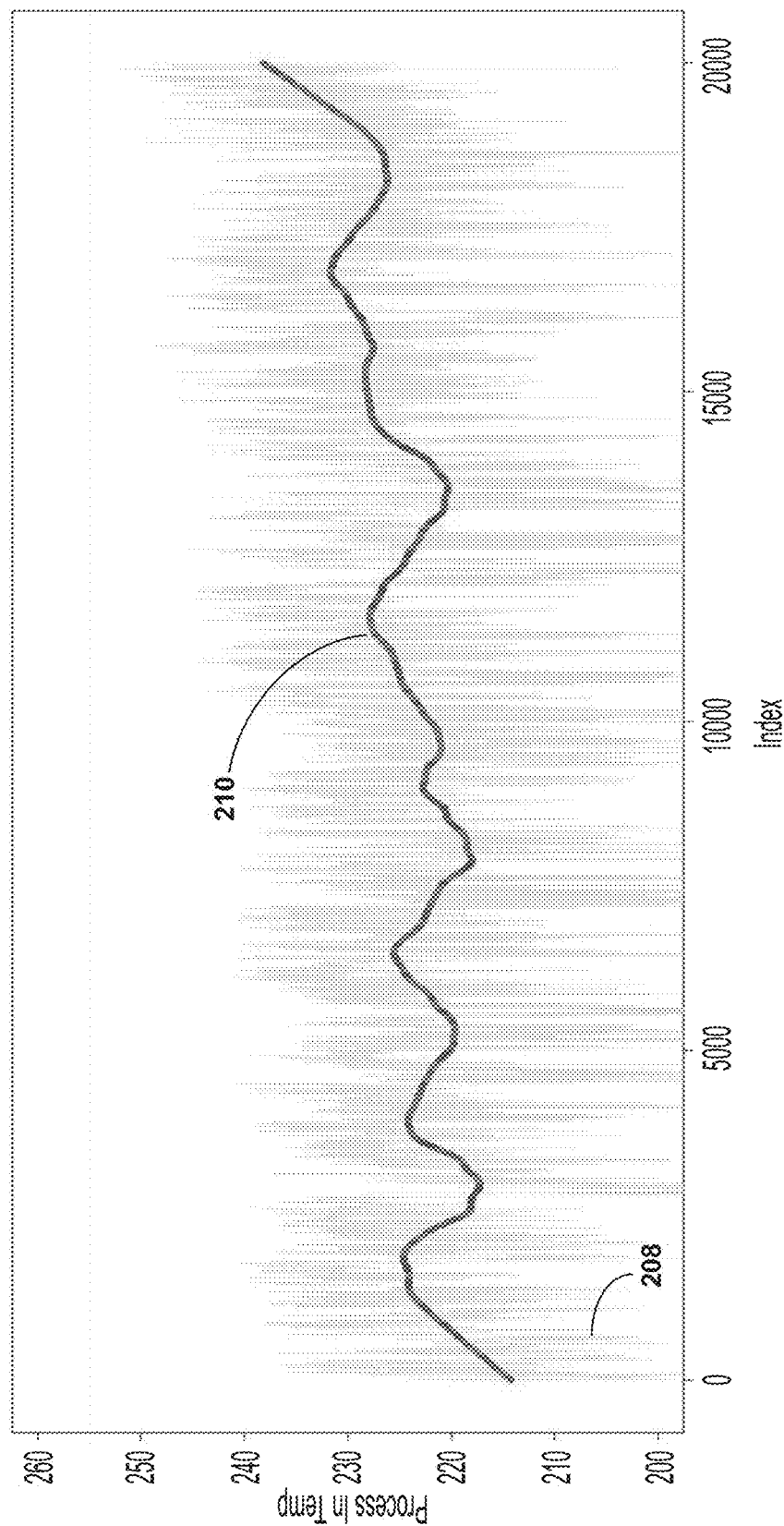
Figure 7:
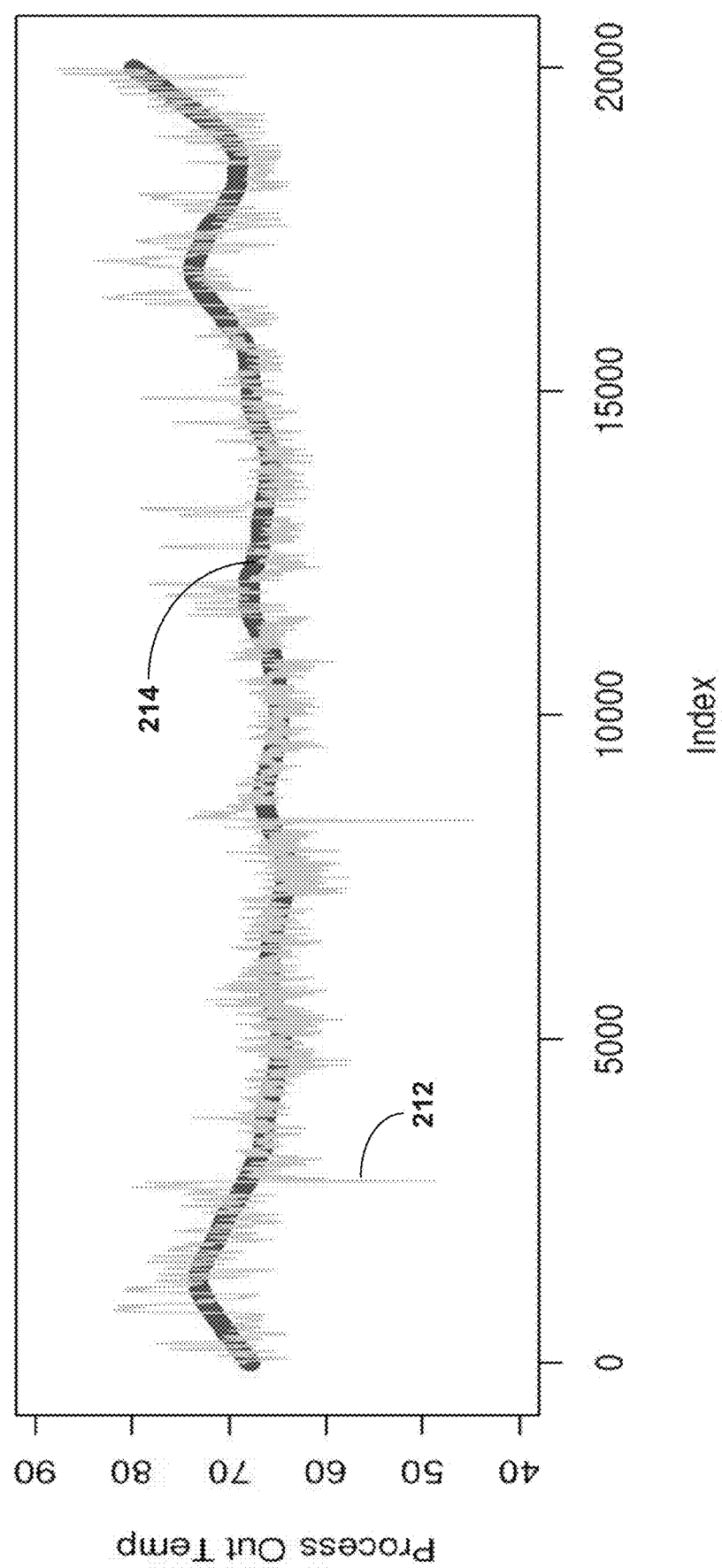
Figure 8:
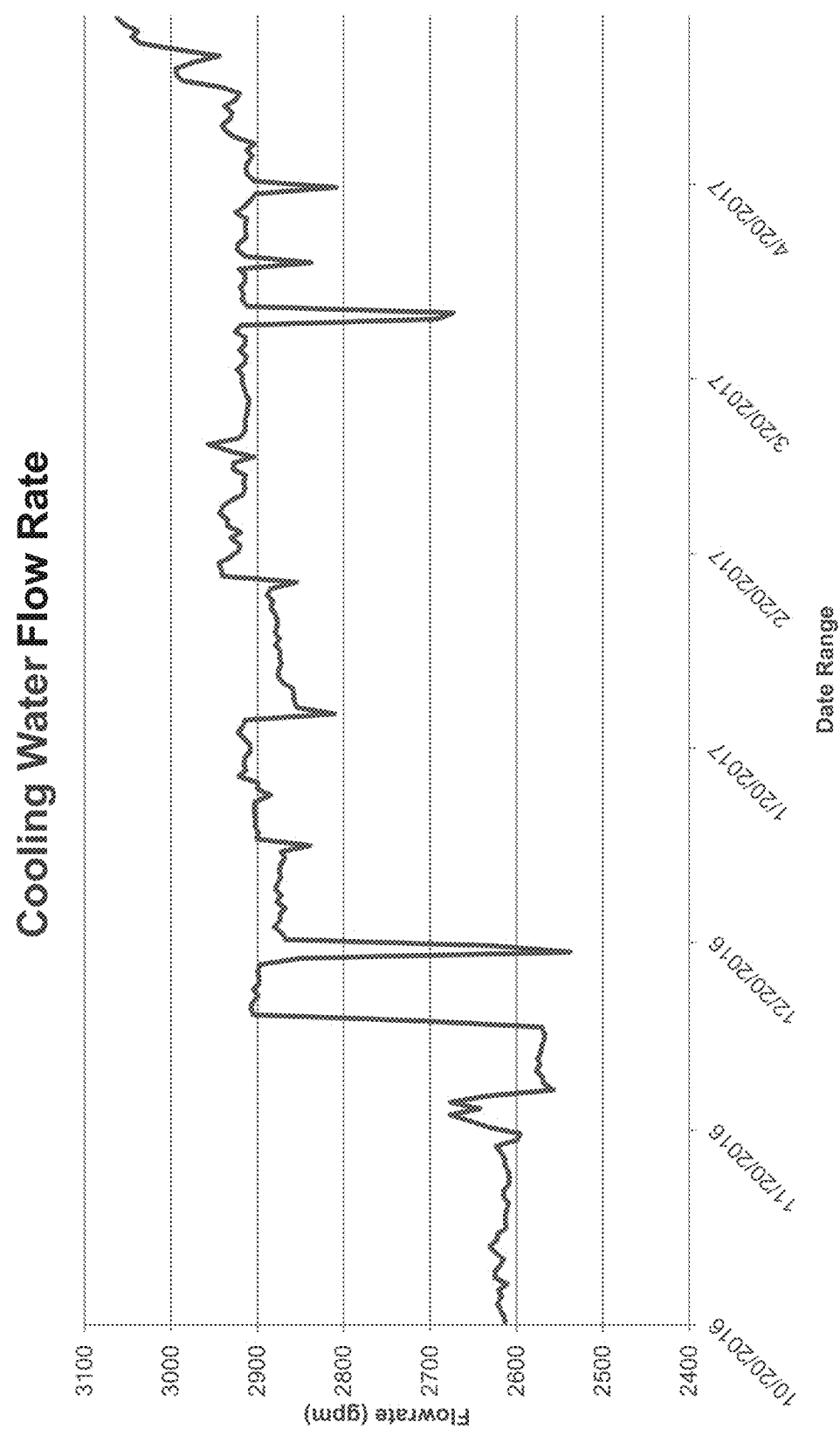
FIG. 8 shows example cooling water flow rate data for the heat exchanger providing temperature data illustrated in FIGS. 4-7.

Temperature data from the heat exchanger were smoothed using local regression with a span of 0.1. FIG. 4 is a graph of the cooling water inlet temperature (degrees Fahrenheit) versus time showing the raw measurement data 200 along with smoothed data 202 overlaid. FIG. 5 is a graph of the cooling water outlet temperature (degrees Fahrenheit) versus time showing the raw measurement data 204 along with smoothed data 206 overlaid. FIG. 6 is a graph of the process stream inlet temperature (degrees Fahrenheit) versus time showing the raw measurement data 208 along with smoothed data 210 overlaid. FIG. 7 is a graph of the process stream outlet temperature (degrees Fahrenheit) versus time showing the raw measurement data 212 along with smoothed data 214 overlaid. FIG. 8 is a graph showing cooling water flow rates (gallons per minute) for an example period of time.

Figure 9:
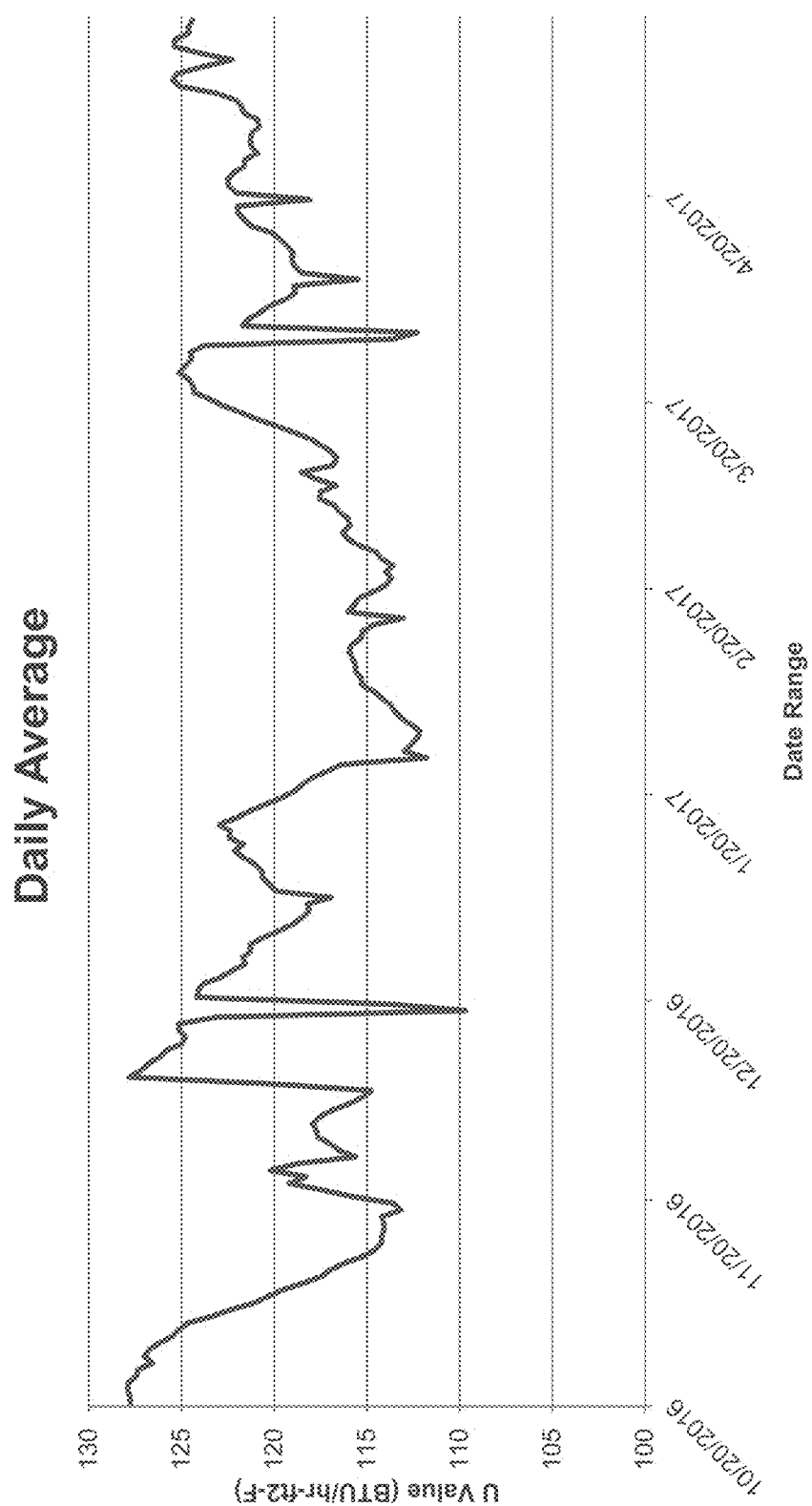
FIG. 9 is a graph showing example heat transfer coefficients calculated using the smoothed temperature data and flow rate data from FIGS. 4-8.

Heat transfer efficiency values and trends were calculated using the smoothed temperature data produced from the temperature sensors installed on the heat exchanger. The heat transfer efficiency trends were used to control the cooling water system, including the chemical additives introduced into the cooling water. FIG. 9 is a graph showing heat transfer coefficients calculated using the smoothed temperature data over the example period of time. The sharp valleys in these data correspond to when water flowrate was decreased.

Figure 10:
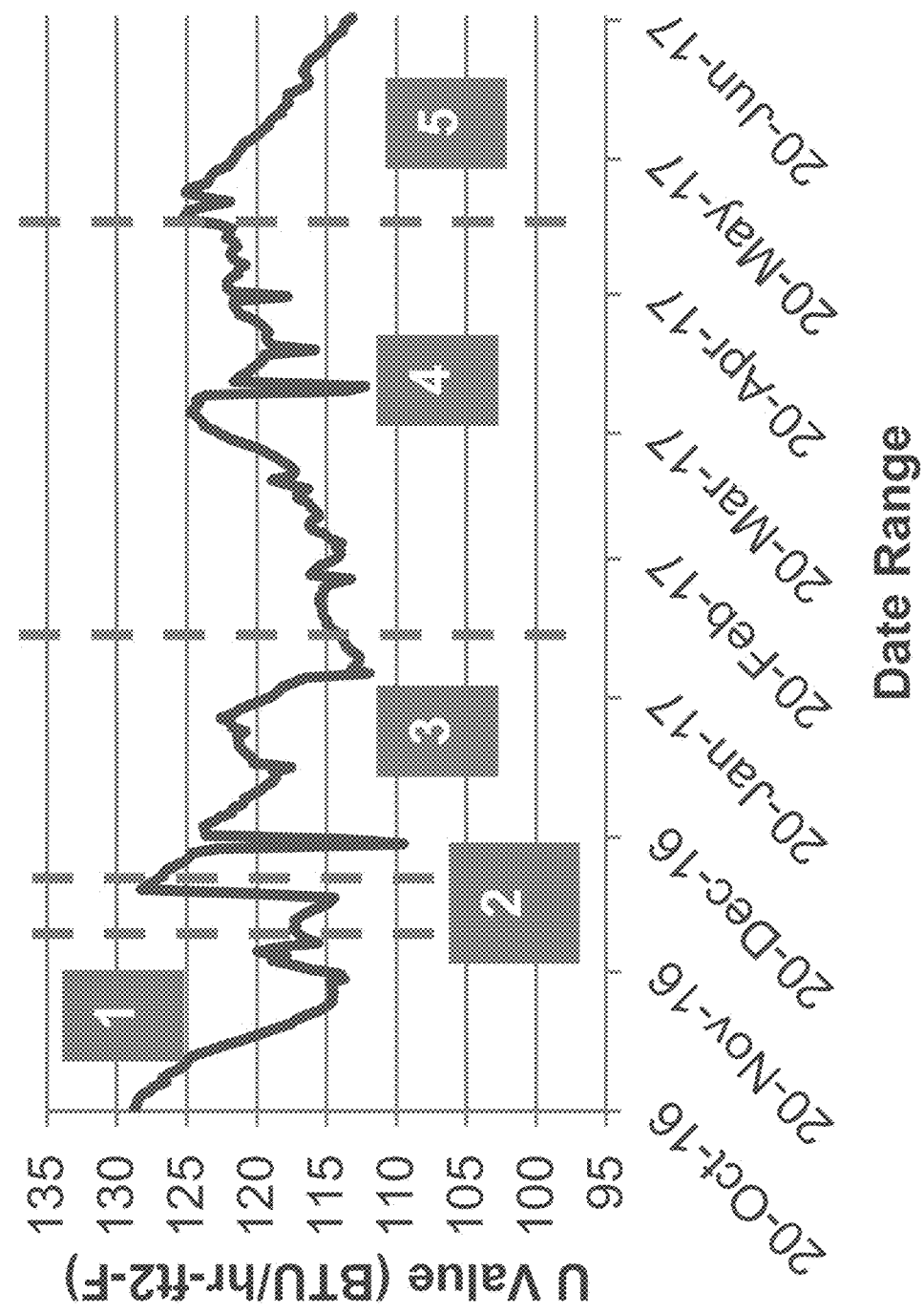
FIG. 10 is a graph showing example heat transfer coefficients calculated using the smoothed temperature data and flow rate data from FIGS. 4-8 overlaid with periodicity markers.
Figure 11:
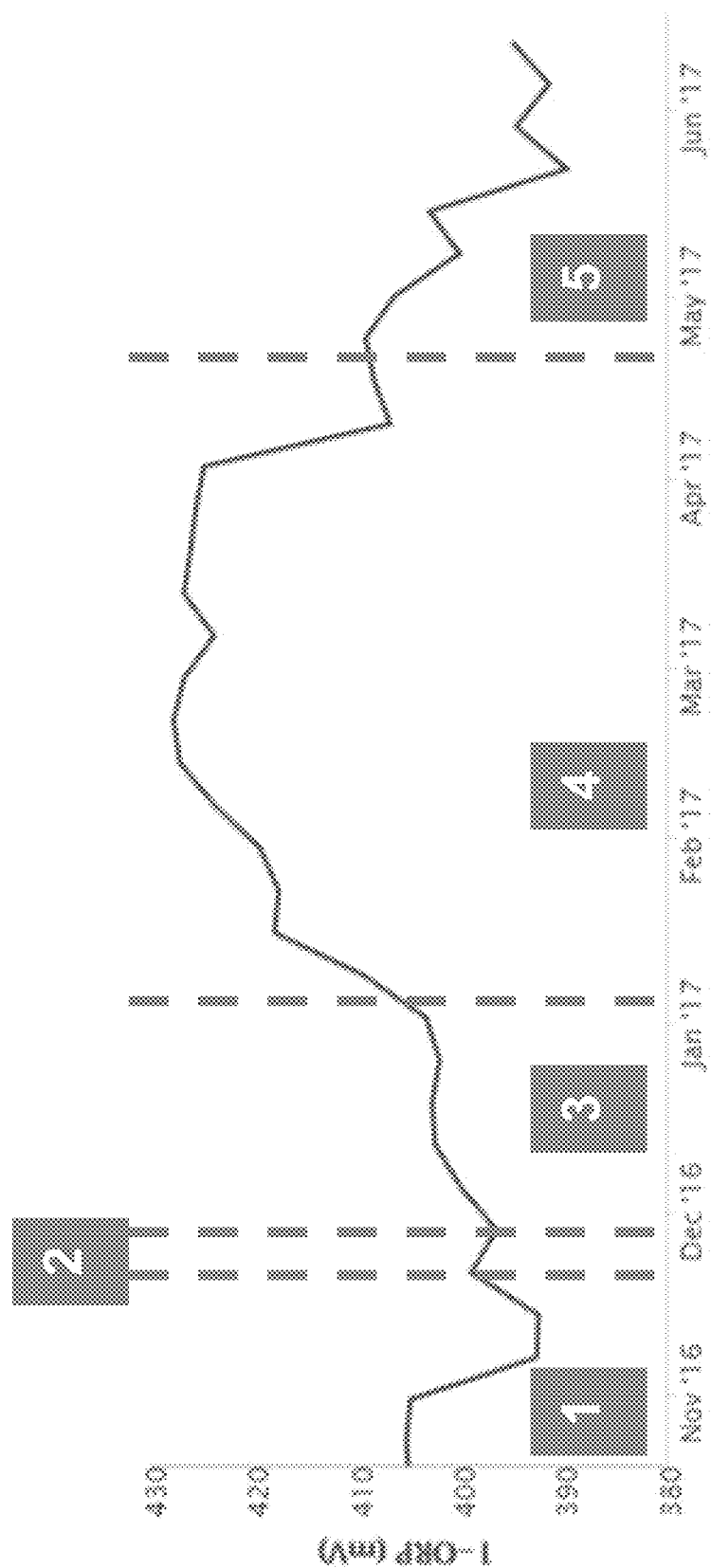
FIG. 11 shows example oxidation-reduction potential (ORP) values for the cooling water stream corresponding to the flow rate data in FIG. 8.

FIG. 10 shows heat transfer coefficients calculated for the heat exchanger based on received temperature and flow rate data over an example range of dates. FIG. 11 shows the oxidation-reduction potential (ORP) for the cooling water stream over the same example range of dates, which is indicative of the concentration of biocidal chemical additive in the cooling water. The data in FIGS. 10 and 11 are sectionalized into five periods of experimental analysis. In the first period, data establishing a heat transfer efficiency trend were established. The data showed a downward trend in heat transfer efficiency. In the second period, the cooling water flow rate was increased, resulting in an increase in the heat transfer coefficient for the heat exchanger proportional to the change in flow rate. In the third period, the trend of the heat transfer efficiency was monitored and observed to decrease.

A changing trend in the heat transfer coefficient, particularly toward the end of the third period, indicated accelerating fouling conditions. Accordingly, interventional action was initiated. The cooling water was evaluated and microbial biofoulants suggested as the cause of the fouling. In phase 4, biocide dosage was increased to the cooling water, resulting in an increase in the heat transfer coefficient. To understand if this heat transfer improvement was in response to biocide dosage increase initiated upon detecting the changing trend in the heat transfer coefficient or some other factor, the biocide dosage was decreased in phase 5. The data show that the heat transfer coefficient again decreased.

Example 2—Vinyl Plant

Temperature sensors were installed on a heat exchanger in a vinyl plant to measure the inlet and outlet temperatures of the flow streams to the heat exchanger as well as the flow rate of cooling water through the inlet of the heat exchanger. The heat exchanger had a propylene stream passing through the hot or process side of the heat exchanger while cooling water flowed through the cold side of the heat exchanger. The heat exchanger was a counter-current shell-and-tube exchanger. The propylene was supplied to the shell side of the heat exchanger at a target flow rate of approximately 270,000 lb/hr, while the cooling water was initially supplied at a target flow rate of approximately 4,600,000 lb/hr.

The cooling water was supplied from a cooling tower that had a recirculation rate of approximately 85,000 gallons/minute. The cooling tower had a capacity of approximately 1,000,000 gallons and exhibited a temperature differential of 10 degrees Fahrenheit. The cooling water exhibited a FRC of 0.5 ppm as $Cl_2$. The cooling water was initially controlled with a combination of three chemical additives: a corrosion inhibitor (Nalco® 3DT177) provided at a concentration of 37 ppm, a scale inhibitor (Nalco® 3DT390) provided at a concentration of 28 ppm, and a yellow metal inhibitor (Nalco® 3DT197) provided at a concentration of 10 ppm.

The data from the four temperature sensors and an ultrasonic flow sensor were communicated by wired connection to a third part data logger. The data logger wirelessly transmitted this raw data to a cloud server. From the cloud server, the data was accessed and analyzed on a personal computer using spreadsheet software.

Figure 12:
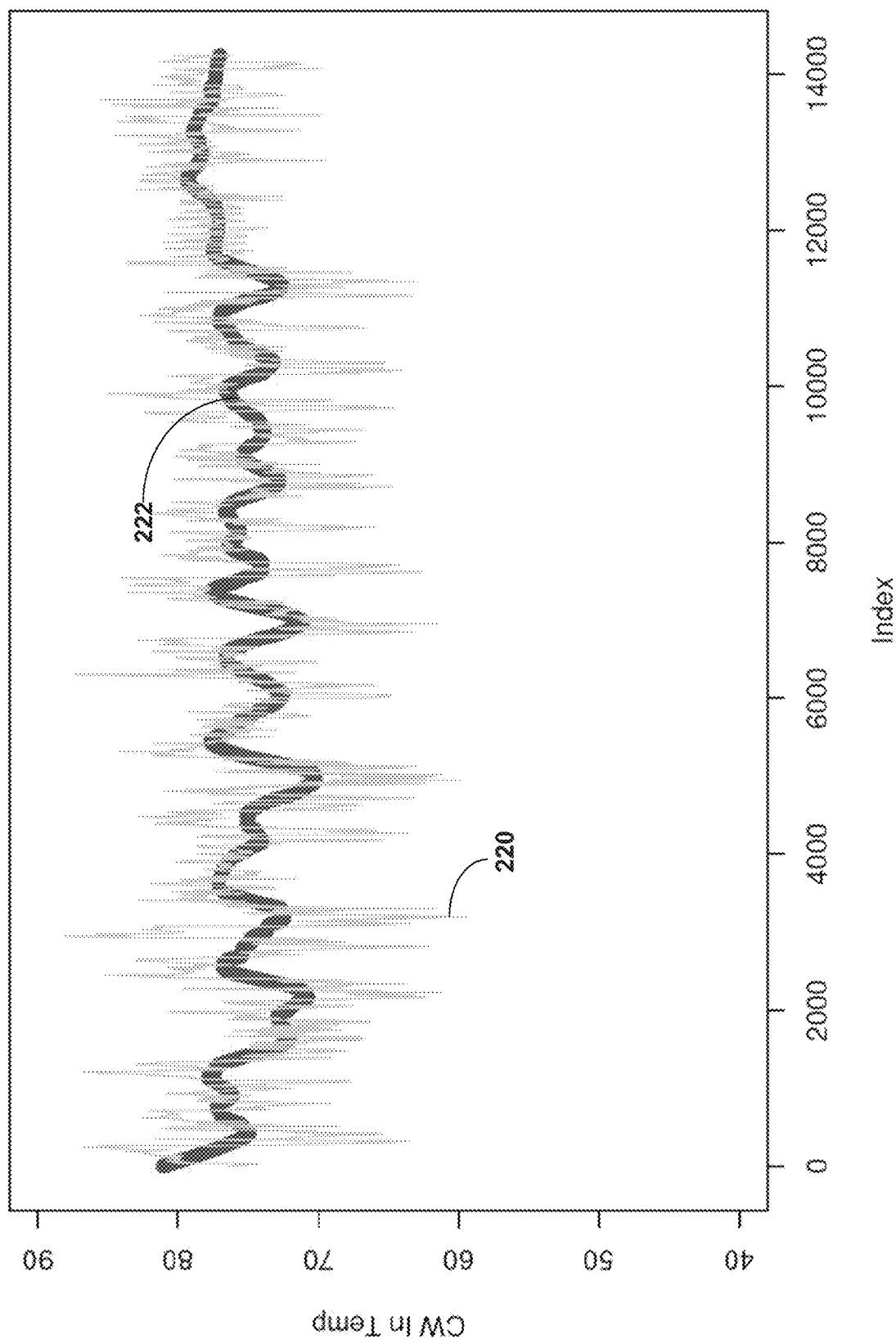
FIGS. 12-15 show example raw and smoothed temperature data for flow streams on another example heat exchanger.
Figure 13:
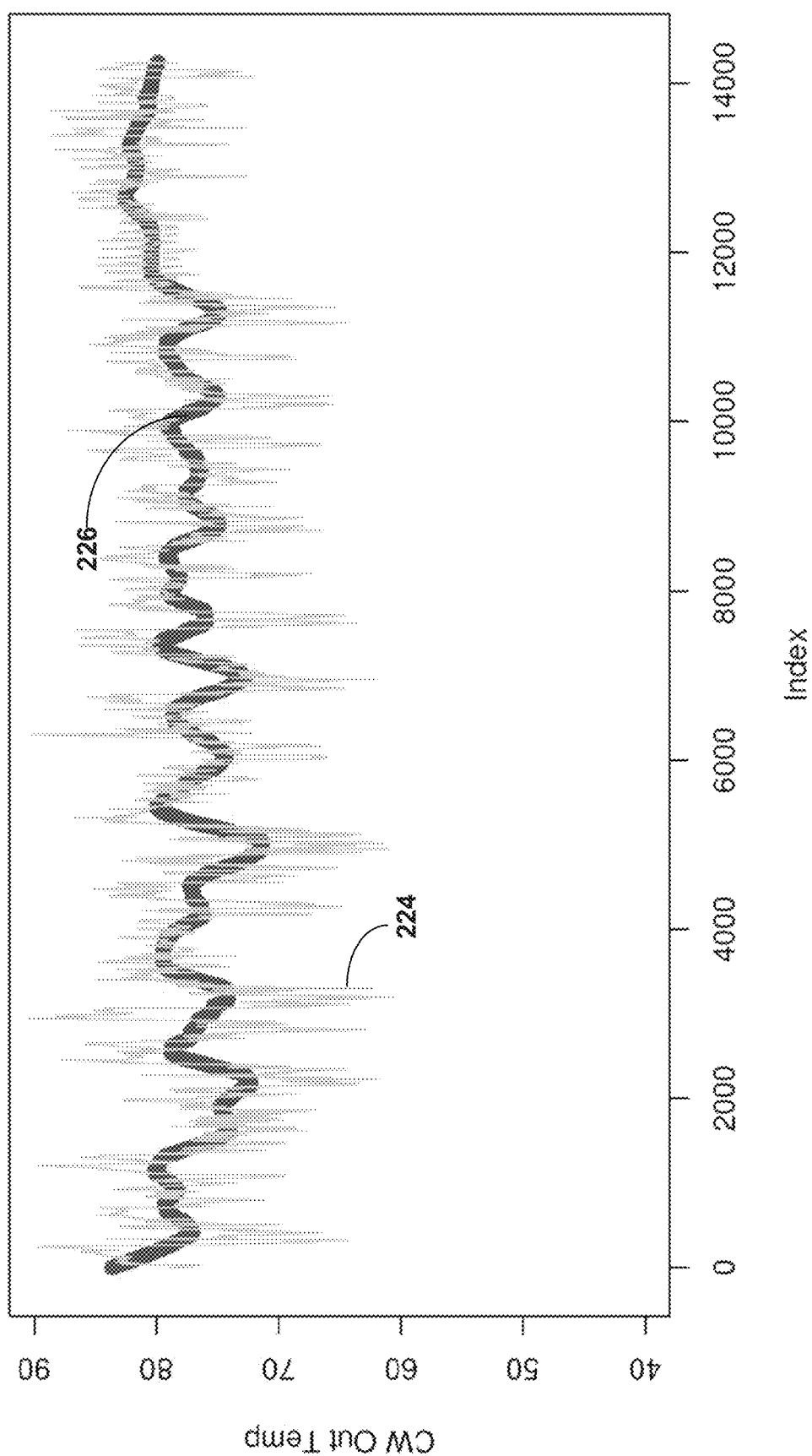
Figure 14:
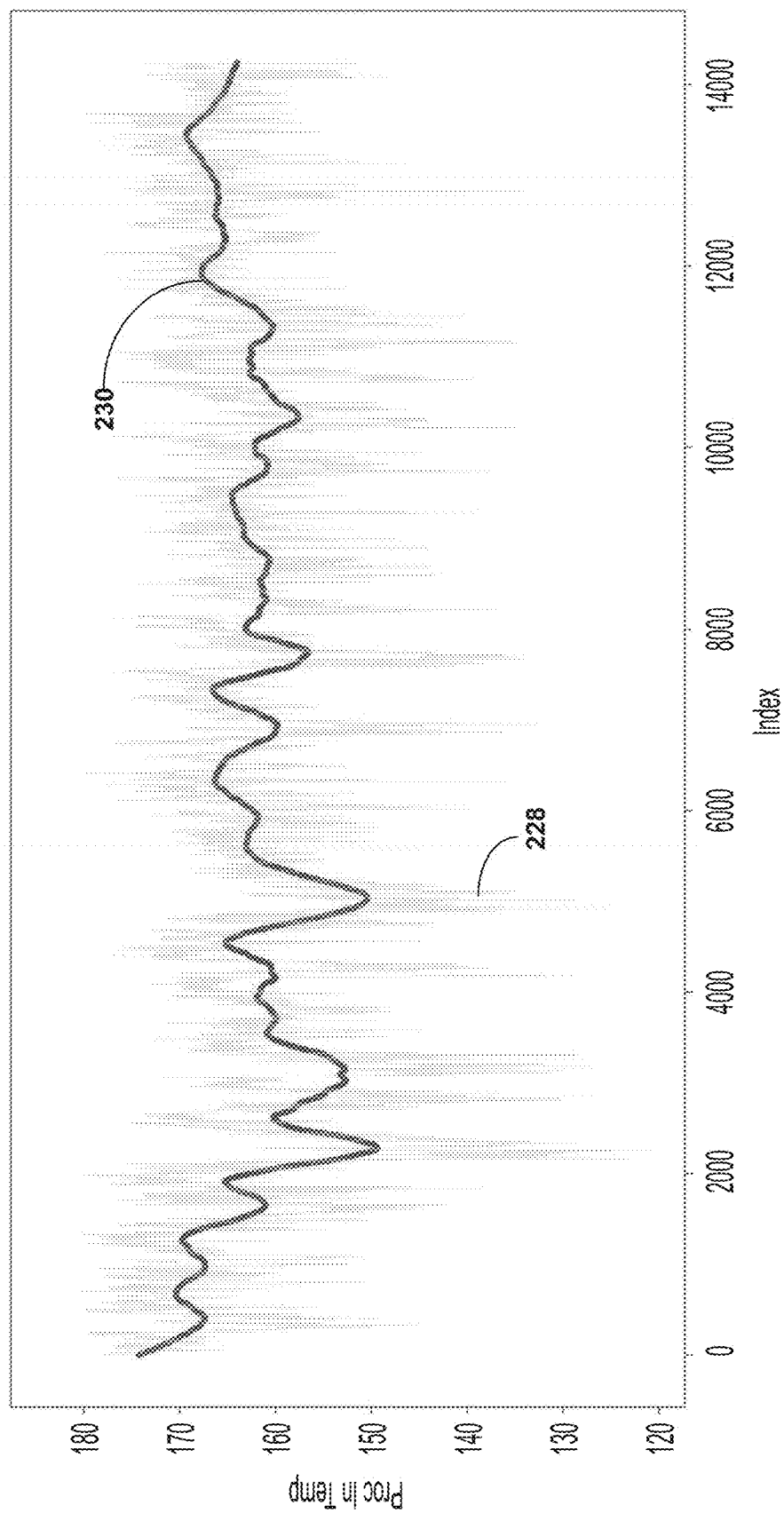
Figure 15:
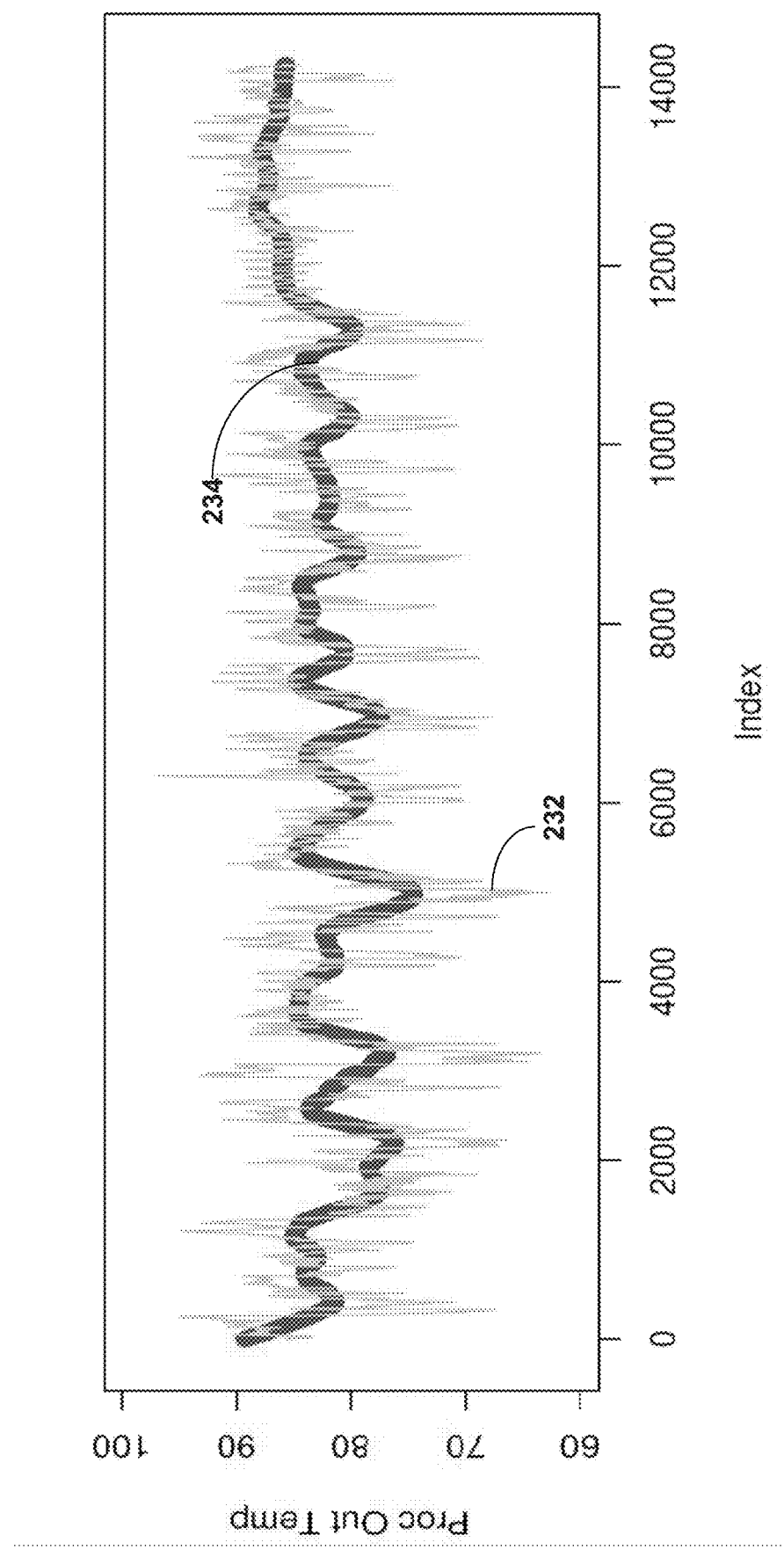
Figure 16:
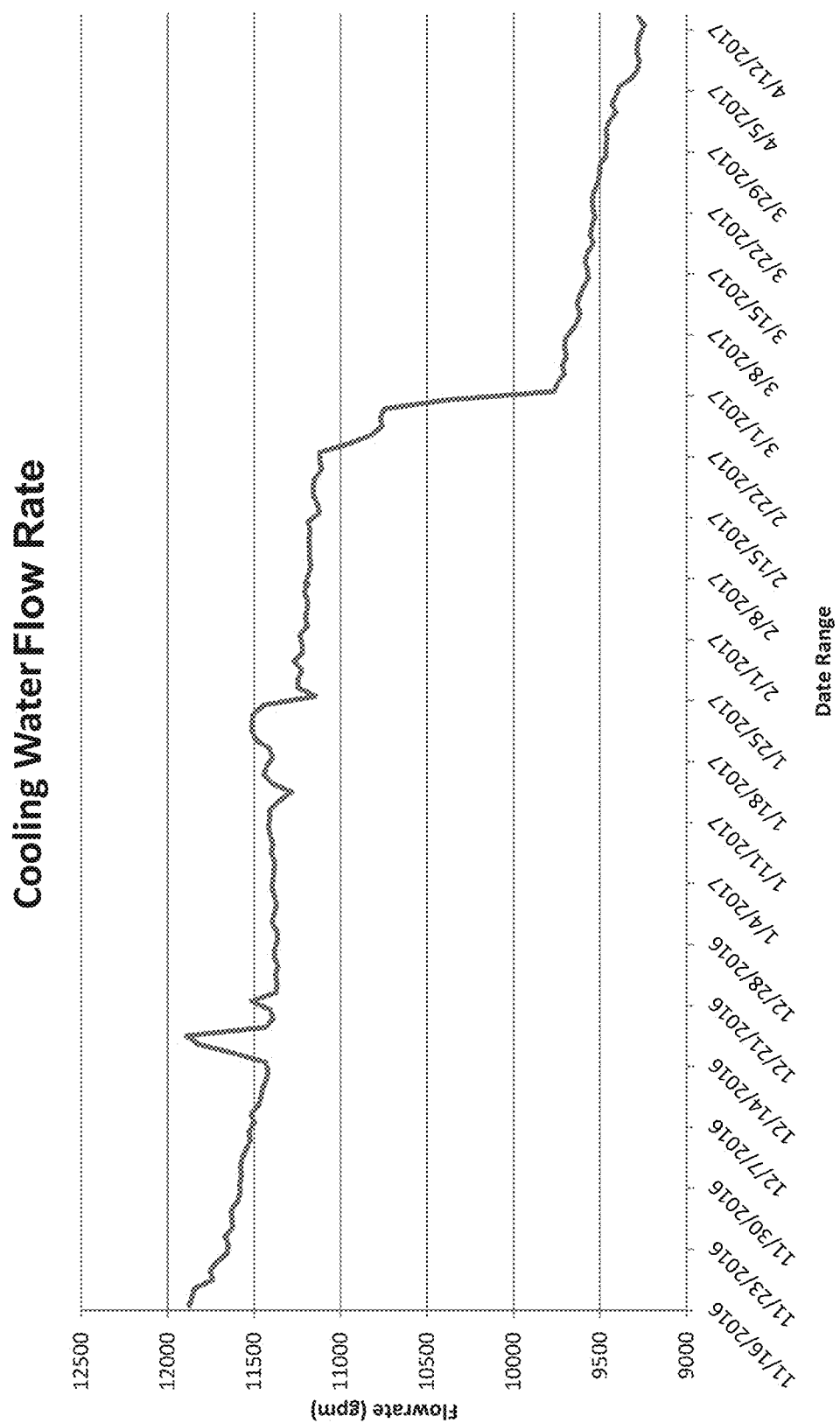
FIG. 16 shows example cooling water flow rate data for the heat exchanger providing temperature data illustrated in FIGS. 12-15.

Temperature data from the heat exchanger were smoothed using local regression with a span of 0.05. FIG. 12 is a graph of the cooling water inlet temperature (degrees Fahrenheit) versus time showing the raw measurement data 220 along with smoothed data 222 overlaid. FIG. 13 is a graph of the cooling water outlet temperature (degrees Fahrenheit) versus time showing the raw measurement data 224 along with smoothed data 226 overlaid. FIG. 14 is a graph of the process stream inlet temperature (degrees Fahrenheit) versus time showing the raw measurement data 228 along with smoothed data 230 overlaid. FIG. 15 is a graph of the process stream outlet temperature (degrees Fahrenheit) versus time showing the raw measurement data 232 along with smoothed data 234 overlaid. FIG. 16 is a graph showing cooling water flow rates (gallons per minute) for an example period of time. The step change in water flow rate was caused by an intentional decrease in the water flow.

Figure 17:
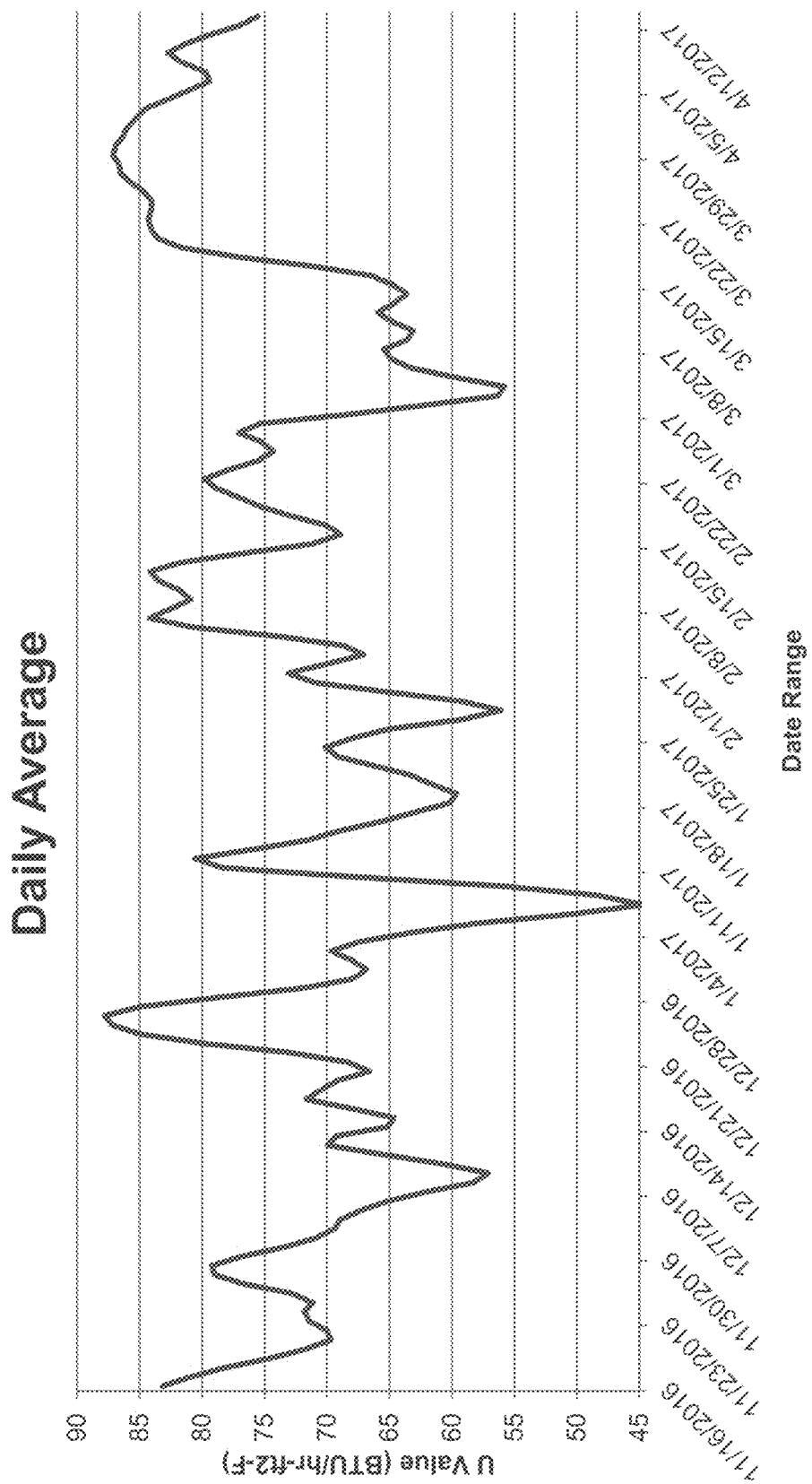
FIG. 17 is a graph showing example heat transfer coefficients calculated using the smoothed temperature data and flow rate data from FIGS. 12-16.

Heat transfer efficiency values and trends were calculated using the smoothed temperature data produced from the temperature sensors installed on the heat exchanger. The heat transfer efficiency trends were used to control the cooling water system, including the chemical additives introduced into the cooling water. FIG. 17 is a graph showing heat transfer coefficients calculated using the smoothed temperature data over the example period of time.

In this example, the heat transfer coefficient trend during the period of measurement was substantially flat despite the fact that an operational change was made to reduce the cooling water flow rate back to its original design value during the monitoring period. In this example, the baseline period used in the analysis was defined as the period before the operational change in the water flow rate; the comparison period used in the analysis was defined as the period after the operational change. The heat transfer trend data in this example did not show a significant change between the baseline period and the comparison. This suggests that the extra water and associated electrical pumping costs incurred by the operator for making the operation change are likely not justified and operator may revert back to the baseline operating conditions.

Example 3—Expanded Monitoring of Ammonia Plant Operation

Figure 18:
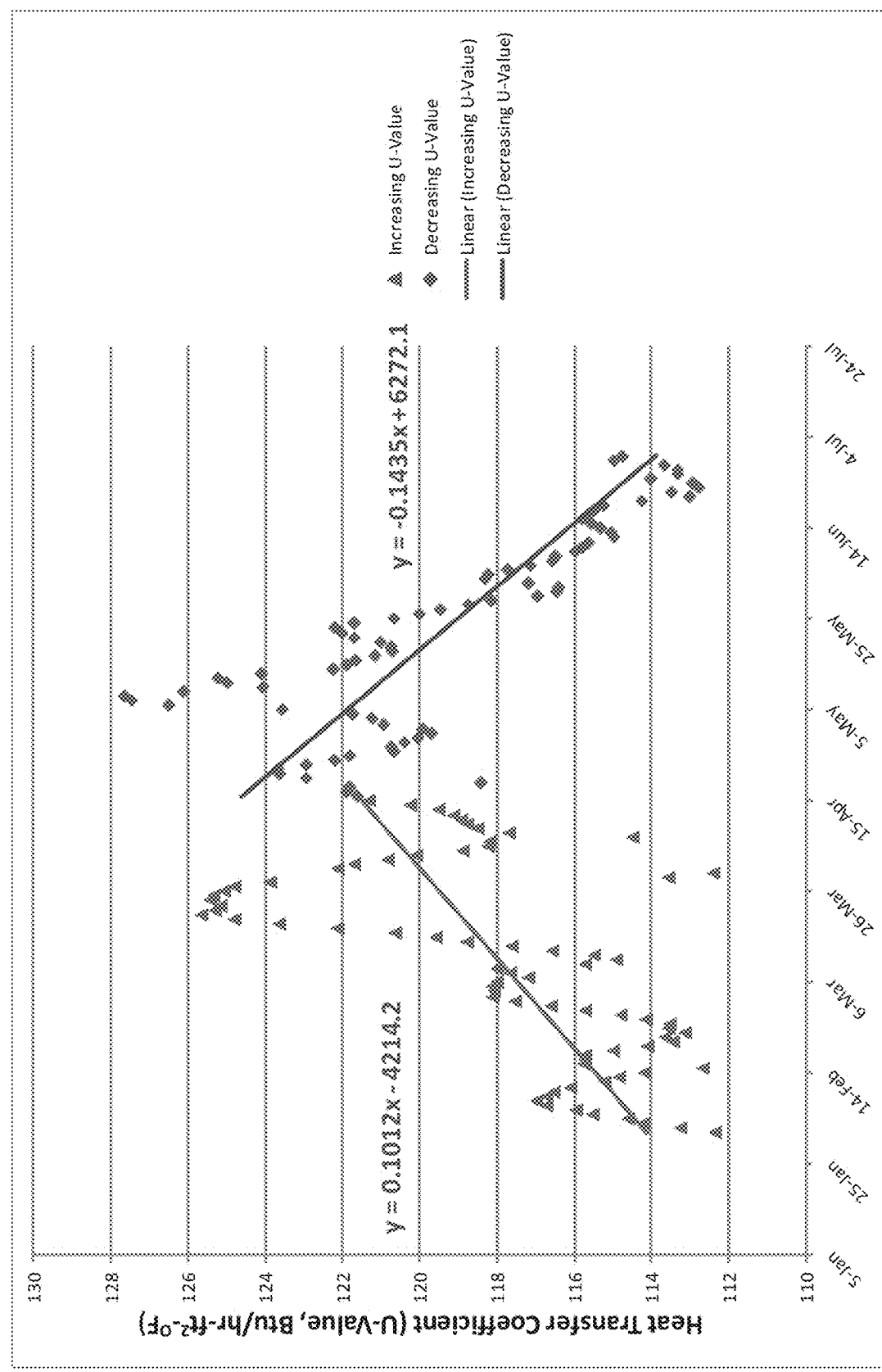
FIG. 18 is a graph showing experimental heat transfer coefficients calculated using smoothed temperature data over period of time.

Expanded monitoring and experimental testing following the principles of the present disclosure were performed at the ammonia plant described in EXAMPLE 1 over a five month experimental period. Temperature data from the heat exchanger were smoothed using local regression. Heat transfer efficiency values and trends were calculated using the smoothed temperature data produced from the temperature sensors installed on the heat exchanger. FIG. 18 is a graph showing heat transfer coefficients calculated using the smoothed temperature data over the example period of time.

The monitored heat transfer trend data shown in FIG. 18 were analyzed using Excel to detect a change in the heat transfer efficiency trend equal to or greater than a threshold value, which may be indicative of a fouling problem. The heat transfer coefficient data were divided into two periods for comparative analysis relative to each other, enabling detection of the change. The first period ranged from February 1 to April 15 in the example, while the second period ranged from April 16 to June 30 in the example. The data for the first period are represented with triangle symbols on FIG. 18, while the data for the second period are represented by square symbols. The dividing time between the two periods was determined based on visual inspection of the data for purposes of the working example. In other applications, the monitored data may be divided based on the occurrence of external events, comparison of new data to a moving average, or other comparative techniques consistent with principles described herein.

In the present example, heat transfer coefficient trends for the two time periods were characterized by fitting a first order curve having a slope and an intercept to each heat transfer coefficient trend. The annualized percent change in the slope of the heat transfer coefficient over the monitored period was also calculated by comparing the annualized heat transfer coefficient trend line slope for each period. The percentage change in the annualized heat transfer coefficient trend was then calculated by subtracting the annualized benchmark period (first period) from the annualized comparison period (second period). The data for the example are provided in the following table:

|  | Start | End | Actual Percent Change | Annualized Percent Change |
|---|---|---|---|---|
| First Period | | | | |
| Time (X-axis) | 1-Feb | 15-Apr | | |
| U-Value (Y-Axis) | 113.82 | 121.21 | 6% | 31.2% |
| Second Period | | | | |
| Time (X-axis) | 16-Apr | 30-Jun | | |
| U-Value (Y-Axis) | 124.42 | 113.65 | −9% | −41.5% |
| Difference in Annualized Change (Comparison Slope − Benchmark Slope) | | | | −73% |

A comparison between the annualized benchmark period (first period) and the annualized comparison period (second period) was negative, indicating a deteriorating heat transfer efficiency for the heat exchange, e.g., which may be indicative of fouling build-up. In this particular working example, the difference was −73% on an annualized basis, which indicated a significant deterioration in heat transfer efficiency given the expected operating conditions. Different thresholds can be established for specific applications against which the percentage change in monitored heat transfer efficiency can be compared to decide whether further analysis of fouling causes is warranted.

To determine a predicted fouling mechanism for the heat exchanger given the magnitude of the change in heat transfer trend, data indicative of cooling water scale fouling, corrosion fouling, and biofouling for the time period of interest were obtained and analyzed. The data were obtained using a combination of online sensors, offline sensor, and wet chemistry tests, with the results stored in a computer-readable medium accessible by a computational program performing the predicted fouling analysis. Individual readings for the monitored parameters were averaged over the benchmark period (first period) and separately averaged over the comparison period (second period) and the percent change between the comparison period and the benchmark period determined. For this particular working example, the example parameters in the following table were monitored over the time period of interest:

|  | Time Period | | |
|---|---|---|---|
|  | Baseline Feb 01-April 15 | Comparison April 16-June 30 | Change |
| Triazole | 2.21 | 1.52 | −31% |
| Turbidity (NTU) | 5.75 | 4.22 | −27% |
| Conductivity (µS/cm) | 4958.12 | 3981.24 | −20% |
| Steel Corr. Rate (mpy) | 1.11 | 0.93 | −16% |
| Dispersant Polymer | 11.21 | 9.79 | −13% |
| Souble Zinc (ppm Zn) | 1.46 | 1.34 | −8% |
| Traced treatment chemical dose (ppm) | 38.75 | 35.96 | −7% |
| ORP (mV) | 423.98 | 397.31 | −6% |
| Total Zinc (ppm Zn) | 1.55 | 1.46 | −6% |
| Cell Fouling (%) | 5.41 | 5.22 | −3% |
| Dispersant Polymer (ppm) | 71.73 | 69.46 | −3% |
| Total Ortho Phosphate (ppm $PO_4$) | 12.05 | 11.70 | −3% |
| pH | 7.71 | 7.62 | −1% |
| Soluble Ortho Phosphate (ppm $PO_4$) | 11.05 | 11.00 | 0% |
| Nitrite (ppm $NO_2$) | 41.82 | 43.50 | 4% |
| Calcium Cycles | 5.34 | 5.72 | 7% |
| Calcium Hardness (ppm as $CaCO_3$) | 151.09 | 166.00 | 10% |
| Temperature (° F.) | 64.52 | 71.04 | 10% |
| Aerobic Bacteria (cfu/ml) | 3.12 | 3.44 | 10% |
| Total Hardness (ppm as $CaCO_3$) | 403.64 | 468.60 | 16% |
| Nitrate (ppm $NO_3$) | 140.64 | 164.85 | 17% |
| m-Alkalinity (ppm as $CaCO_3$) | 74.00 | 86.80 | 17% |
| Magnesium Hardness (ppm Mg) | 253.82 | 302.60 | 19% |
| Copper Corr. Rate (mpy) | 0.02 | 0.02 | 22% |
| Total Chlorine (ppm $Cl_2$) | 1.81 | 2.37 | 31% |
| Anaerobic Bacteria (cfu/ml) | 0.22 | 0.41 | 87% |

From the example data reproduced above, an aggregate scale fouling score was calculated using parameters indicative of scale fouling, an aggregate corrosion fouling score was calculated using parameters indicative of corrosion fouling, and an aggregate biofouling score was calculated using parameters indicative of biofouling. The scores were calculated by applying weighting factors to each percent change determined according to the table above for each parameter of interest between the comparison period and the benchmark period. An aggregate score for each potential fouling mechanism was then calculated by averaging the all the weighted parameters designated as being associated with that potential fouling mechanism. The results of the analysis are provided in the following table:

|  | Weighting | Value (% Change × Weighting) |
|---|---|---|
| Biofouling Indicators | | |
| ORP | -4.00 | 0.25 |
| Turbidity | 0.25 | -0.07 |
| Aerobic Bacteria | 4.00 | 0.41 |
| Anaerobic Bacteria | 4.00 | 3.49 |
| Nitrite | 2.50 | 0.10 |
| Nitrate | 2.50 | 0.43 |
| Score | | 0.77 |
| Scale Fouling Indicators | | |
| Turbidity | 1.00 | -0.27 |
| Temperature | 2.50 | 0.25 |
| pH | 4.00 | -0.05 |
| PO4 | 2.00 | -0.01 |
| Ca | 1.00 | 0.10 |
| Mg | 1.00 | 0.19 |
| Score | | 0.04 |
| Corrosion Fouling Indicators | Weighting | |
| Temperature | 1 | 0.10 |
| pH | -4 | 0.05 |
| Steel Corrosion Rate | 4 | -0.64 |
| Copper Corrosion Rate | 4 | 0.90 |
| Azole | -2.5 | 0.78 |
| PO4 | -2.5 | 0.01 |
| Zn | -2.5 | 0.21 |
| Score | | 0.20 |

Figure 19:
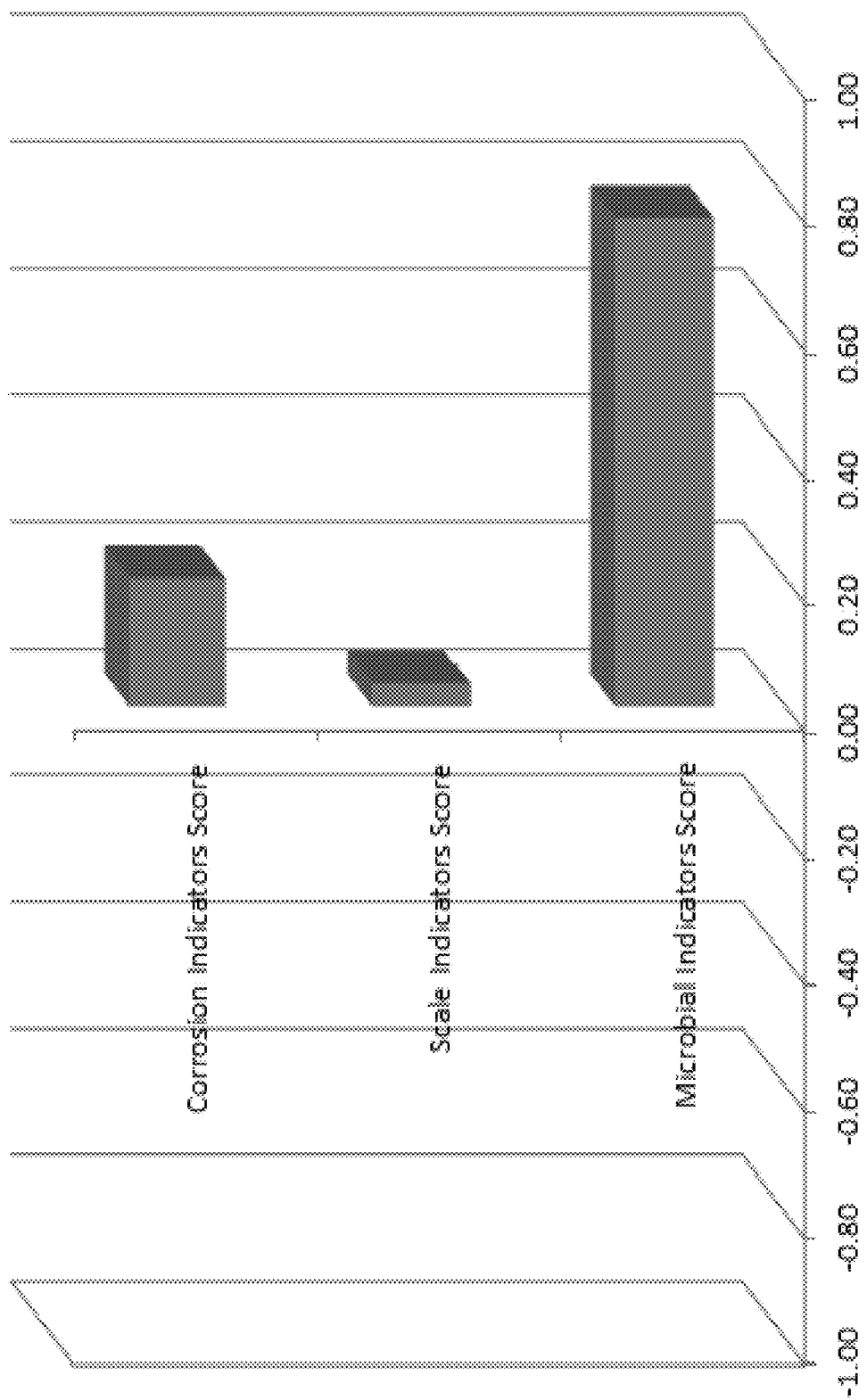
FIG. 19 is a bar graph showing aggregate fouling scores for different potential fouling mechanisms associated with the data in FIG. 18.

As seen above, an aggregate biofouling score of 0.77 was determined, which was significantly greater than the scale fouling score and corrosion fouling score of 0.04 and 0.20, respectively. FIG. 19 is a bar graph showing the aggregate fouling scores for the different potential fouling mechanisms. The data indicate that the predicated fouling mechanism associated with the detected change in heat transfer trend for the heat exchanger is biofouling. Accordingly, corrective action to mitigate the biofouling, including controlling the addition of one or more chemicals to the cooling water to reduce or eliminate the incipient biofouling can be undertaken.

The result of the predictive cause and treatment analysis outlined above for this example matched our hypothesis based on our domain knowledge of the ammonia plant and known challenges with respect to ammonia leakage into the cooling tower. This source of ammonia creates a nitrogen source for the biofilms and microbial systems to grow in the water. The baseline case had a high ORP value ~424 mV (during the period in which the U-Value had an increasing trend) and the comparison case had a lower value ~397 mV. The data suggest that an aggregate biofouling score greater than or equal to 0.5 may be an appropriate threshold, for some operating cases, for determining that biofouling is problematic and taking corresponding remedial action.

The experimental example was also useful to quantify an ORP set point in the real system, which is typically a trial and error process. With the present analysis of heat transfer coefficients, we were able to demonstrate that an ORP around 425 mV is a better set point to inhibit microbial growth (for the particular experimental system). At the same time, we did not see much difference in corrosion scores between the baseline and comparison cases, confirming our hypothesis that a 425 mV ORP set point did not cause corrosion stresses. It is highly interesting to note, however, that as ORP goes down from 424 mV to 397 mV between the baseline and comparison cases, corrosion stress seems to increase. This might suggest microbiological induced corrosion. This is counter-intuitive since less ORP generally means lower corrosion rates, where MIC is not a factor.

Example 4—Expanded Monitoring of Vinyl Plant Operation

Figure 20:
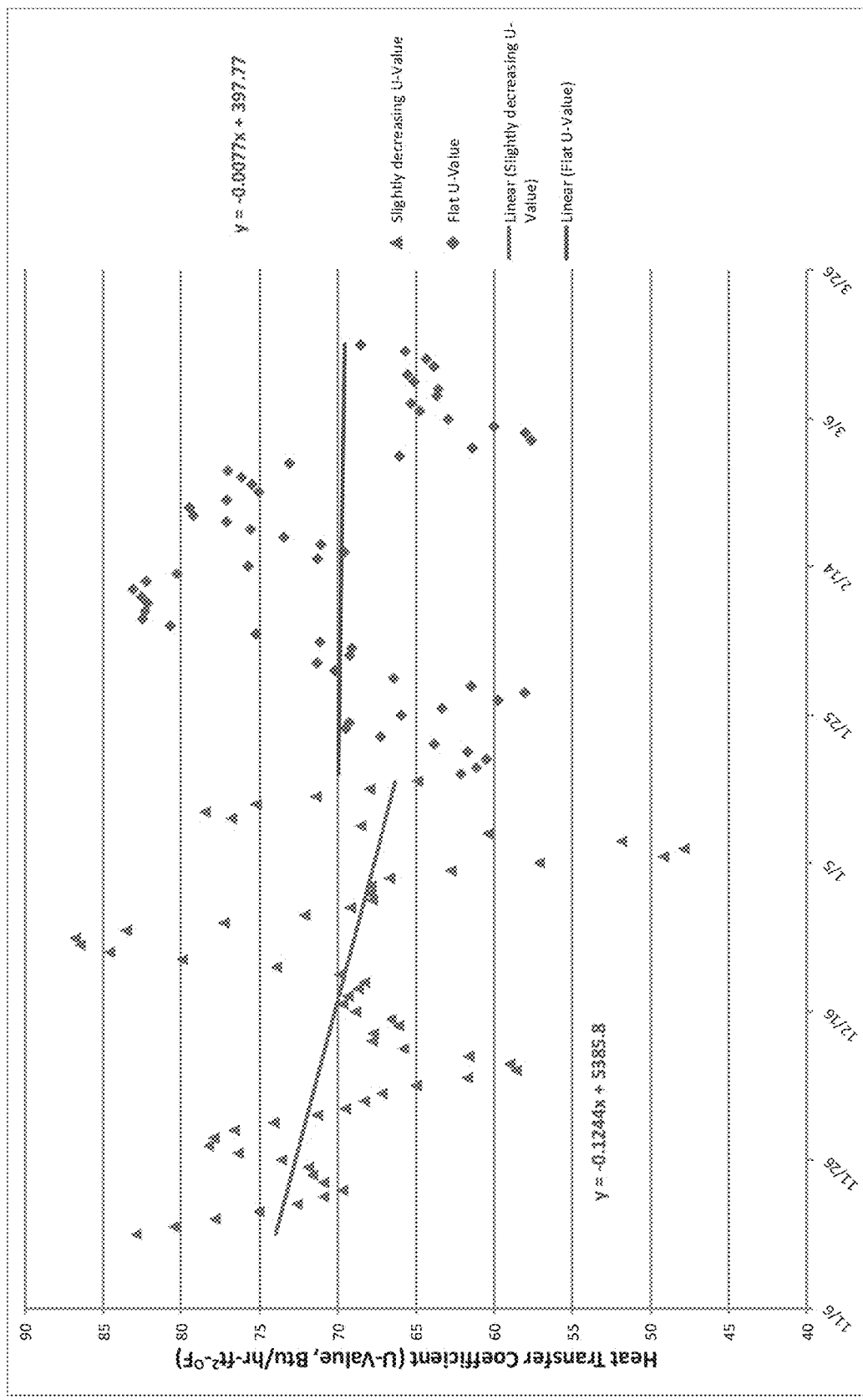
FIG. 20 is a graph showing experimental heat transfer coefficients calculated using smoothed temperature data over a period of time.

Expanded monitoring and experimental testing following the principles of the present disclosure were also performed at the Vinyl plant described in EXAMPLE 2 over a four month experimental period. Temperature data from the heat exchanger were smoothed using local regression. Heat transfer efficiency values and trends were calculated using the smoothed temperature data produced from the temperature sensors installed on the heat exchanger. FIG. 20 is a graph showing heat transfer coefficients calculated using the smoothed temperature data over the example period of time.

The monitored heat transfer trend data shown in FIG. 20 were analyzed using Excel to detect a change in the heat transfer efficiency trend equal to or greater than a threshold value, which may be indicative of a fouling issue. The heat transfer coefficient data were divided into two periods for comparative analysis relative to each other for detection of the change. The first period ranged from November 16 to January 16, while the second period ranged from January 17 to March 16 in the example. The data for the first period are represented with triangle symbols on FIG. 20, while the data for the second period are represented by square symbols.

Heat transfer coefficient trends for the two time periods were characterized by fitting a first order curve having a slope and an intercept to each heat transfer coefficient trend. The percent change in the heat transfer coefficient over the monitored period was also calculated by comparing the heat transfer coefficient at the beginning of the monitored trend for each period to the heat transfer coefficient at the end of the monitored trend. The percent change for each period was subsequently extended from the monitored time period to an annualized (12 month) basis, e.g., to allow the two periods to be compared against each other on a standardized basis even if the actual periods were of different duration. The percentage change in the heat transfer coefficient trend was then calculated by subtracting the annualized benchmark period (first period) from the annualized comparison period (second period). The data for the example are provided in the following table:

|  | Start | End | Actual Percent Change | Annualized Percent Change |
|---|---|---|---|---|
| First Period | | | | |
| Time (X-axis) | 16-Nov | 16-Jan | | |
| U-Value (Y-Axis) | 75.16 | 67.58 | -10% | -61% |
| Second Period | | | | |
| Time (X-axis) | 17-Jan | 16-Mar | | |
| U-Value (Y-Axis) | 68.58 | 68.13 | -1% | -4% |
| Difference in Annualized Change (Comparison Slope - Benchmark Slope) | | | | 57% |

A comparison between the annualized baseline period (first period) and the annualized comparison period (second period) was positive, indicating that heat transfer efficiency for the heat exchange is trending upwards (in a desirable direction). In this case, the baseline period and comparison period were separated by an exchanger maintenance event (e.g., exchanger cleaning) that found debris fouling. Accordingly, the techniques described herein were used to determine whether or not debris fouling could be distinguished from other types of fouling, particularly scale fouling, corrosion fouling, and microbial fouling.

To explore this hypothesis based on the trend date, data indicative of cooling water scale fouling, corrosion fouling, and biofouling for the time period of interest were obtained and analyzed. The data were obtained using a combination of online sensors, offline sensor, and wet chemistry tests, with the results stored in a computer-readable medium accessible by a computational program performing the predicted fouling analysis. Individual readings for the monitored parameters were averaged over the benchmark period (first period) and separately averaged over the comparison period (second period) and the percent change between the comparison period and the benchmark period determined. For this particular working example, the example parameters in the following table were monitored over the time period of interest:

|  | Time Period | | |
| --- | --- | --- | --- |
|  | Baseline Nov 16-Jan 16 | Comparison Jan 17-Mar 16 | Change |
| pH | 7.72 | 7.93 | 3% |
| CONDUCTIVITY (µS/cm) | 2865.17 | 2930.00 | 2% |
| CALCIUM HARDNESS (ppm as CaCO$_3$) | 874.17 | 850.17 | -3% |
| FREE CHLORINE (ppm cl$_2$) | 0.63 | 0.65 | 4% |
| O—PO4 (filtered) (ppm PO$_4$) | 6.81 | 6.36 | -7% |
| IRON (ppm Fe) | 0.46 | 0.26 | -44% |
| COPPER (ppm Cu) | 0.01 | 0.02 | 49% |
| MILD STEEL GENERAL CORROSION RATE (mpy) | 0.35 | 0.23 | -35% |
| COPPER GENERAL CORROSION RATE (mpy) | 0.06 | 0.03 | -51% |
| TURBIDITY (NTU) | 5.23 | 1.85 | -65% |
| TRIAOLE (ppm) | 0.42 | 0.67 | 60% |
| ORP (mV) | 745.35 | 676.91 | -9% |
| TEMPERATURE (def F.) | 79.16 | 78.13 | -1% |

From the example data reproduced above, an aggregate scale fouling score was calculated using parameters indicative of scale fouling, an aggregate corrosion fouling score was calculated using parameters indicative of corrosion fouling, and an aggregate biofouling score was calculated using parameters indicative of biofouling. The scores were calculated by applying weighting factors to each percent change determined according to the table above for each parameter of interest between the comparison period and the benchmark period. An aggregate score for each potential fouling mechanism was then calculated by averaging the all the weighted parameters designated as being associated with that potential fouling mechanism. The results of the analysis are provided in the following table:

|  | Weighting | |
| --- | --- | --- |
| Biofouling Indicators | | |
| ORP | -4.00 | 0.37 |
| Turbidity | 0.25 | 0.46 |
| Aerobic Bacteria | 4.00 | 0.00 |
| Anaerobic Bacteria | 4.00 | 0.00 |
| Nitrite | 2.50 | 0.00 |
| Nitrate | 2.50 | 0.00 |
|  | Score | 0.14 |
| Scale Fouling Indicators | | |
| Turbidity | 1.00 | -0.65 |
| Temperature | 2.50 | -0.03 |
| pH | 4.00 | 0.11 |
| PO4 | 2.00 | -0.13 |
| Ca | 1.00 | -0.03 |
| Mg | 1.00 | 0.00 |
|  | Score | -0.12 |
| Corrosion Fouling Indicators | | |
| Temperature | 1 | -0.013 |
| pH | -4 | -0.112 |
| Steel Corrosion Rate | 4 | -1.38 |
| Copper Corrosion Rate | 4 | 1.96 |
| Azole | -2.5 | -1.5 |
| PO4 | -2.5 | 0.17 |
| Cu | 4 | 1.96 |
| Fe | 4 | -1.78 |
|  | Score | -0.09 |

Figure 21:
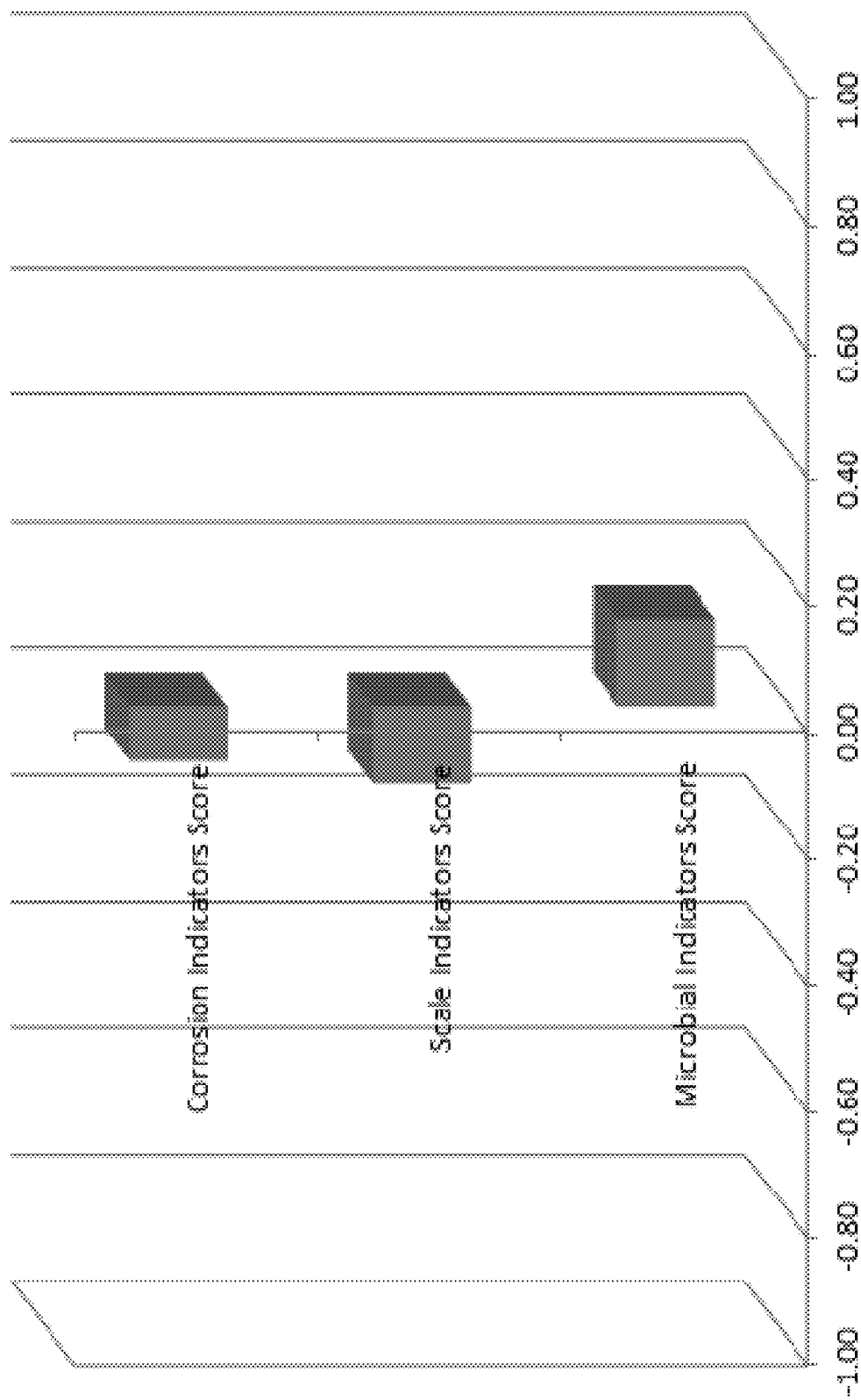
FIG. 21 is a bar graph showing aggregate fouling scores for different potential fouling mechanisms associated with the data in FIG. 20.

As seen above, aggregate biofouling, scale fouling, and corrosion fouling scores of 0.14, -0.12, and -0.09, respectively, were determined. FIG. 21 is a bar graph showing the aggregate fouling scores for the different potential fouling mechanisms. In general, the lower the value for a particular aggregate fouling score (including negative values) for this example, the less likely the corresponding fouling mechanism is to be causing fouling in the system under evaluation. As the fouling scores are all less than 0.25 in this particular example, the data confirm the hypothesis that neither scale fouling, nor corrosion fouling, nor microbial fouling were an operative fouling mechanism in this heat exchanger.

The invention claimed is:
1. A method comprising:
monitoring, by one or more processors, a heat transfer efficiency of at least one heat exchanger and establishing a heat transfer efficiency trend for the heat exchanger, the heat exchanger having a process stream-side and a cooling water stream-side;
detecting, by the one or more processors, a change in the heat transfer efficiency trend;
receiving, by the one or more processors, data indicative of scale fouling on the cooling water stream-side;
receiving, by the one or more processors, data indicative of corrosion fouling on the cooling water stream-side;
receiving, by the one or more processors, data indicative of biofouling on the cooling water stream-side;
determining, by the one or more processors, a predicted cause of the detected change in the heat transfer efficiency trend based at least on the received data indicative of scale fouling, corrosion fouling, and biofouling by at least determining an aggregate scale fouling score based on the received data indicative of scale fouling, an aggregate corrosion fouling score based on the received data indicative of corrosion fouling, and an aggregate biofouling score based on the received data indicative of biofouling; and
controlling addition of a chemical additive into a cooling water that is in fluid communication with the cooling water stream-side of the at least one heat exchanger based on the predicted cause.

2. The method of claim 1, wherein monitoring the heat transfer efficiency comprises receiving data from a plurality of sensors indicative of at least a temperature of the cooling water stream entering the heat exchanger, a temperature of the cooling water stream exiting the heat exchanger, a temperature of a process stream entering the heat exchanger, a temperature of the process stream exiting the heat exchanger, and a flow rate of the cooling water.

3. The method of claim 2, wherein monitoring the heat transfer efficiency for the heat exchanger comprises determining the heat transfer efficiency according to an equation:

$$U\text{-Value:} \frac{\dot{m} C_p \Delta T_{water}}{\Delta T_{LMTD} \times \text{Heat Tr. Area} \times F_t}$$

wherein U-Value is the heat transfer efficiency, m is the mass flow rate of the cooling water stream, $C_p$ is the specific heat of the cooling water stream, $\Delta T_{water}$ is a difference between the temperature of the cooling water stream exiting the heat exchanger and the temperature of the cooling water stream entering a heat exchanger, Heat Tr. Area is an amount of surface area of the heat exchanger over which thermal energy is transferred between the process stream and the cooling water stream, $F_t$ is a correction factor corresponding to a geometry of the heat exchanger and $\Delta T_{LMTD}$ is a log-mean temperature difference calculated using a following equation if the cooling water stream and the process stream flow in a counter-current direction:

$$\Delta T_{LMTD} = \frac{(T_{process,in} - t_{water,out}) - (T_{process,out} - t_{water,in})}{\log_e \frac{T_{process,in} - t_{water,out}}{T_{process,out} - t_{water,in}}}$$

or calculated using a following equation if the cooling water stream and the process stream flow in a co-current direction:

$$\Delta T_{LMTD} = \frac{(T_{process,in} - t_{water,in}) - (T_{process,out} - t_{water,out})}{\log_e \frac{T_{process,in} - t_{water,in}}{T_{process,out} - t_{water,out}}}$$

wherein $T_{Process,in}$ is the temperature of the process water stream entering the heat exchanger, $T_{Process,out}$ is the temperature of the process stream exiting the heat exchanger, $t_{water,in}$ is the temperature of the cooling water stream entering the heat exchanger, and $t_{water,out}$ is the temperature of the cooling water stream exiting the heat exchanger.

4. The method of claim 2, further comprising smoothing the data corresponding to the temperature of the cooling water stream entering the heat exchanger, the temperature of the cooling water stream exiting the heat exchanger, the temperature of the process stream entering the heat exchanger, and the temperature of the process stream exiting the heat exchanger,
wherein determining the heat transfer efficiency comprises determining the heat transfer efficiency using smoothed temperature values.

5. The method of claim 1, wherein:
establishing the heat transfer efficiency trend comprises fitting a first order curve to the heat transfer efficiency monitored for the heat exchanger over a period of time, the first order curve having a slope, and
detecting a change in the heat transfer efficiency trend comprises determining a change in the slope equal to or greater than a threshold amount.

6. The method of claim 5, wherein the threshold amount ranges from 5 percent to 20 percent.

7. The method of claim 1, wherein establishing the heat transfer efficiency trend comprises determining the heat transfer efficiency for the heat exchanger at least once per day over a period of time.

8. The method of claim 1, wherein receiving data indicative of scale fouling comprises receiving data selected from the group consisting of a concentration of phosphate in the cooling water, a concentration of calcium in the cooling water, a concentration of manganese in the cooling water, a concentration of aluminum in the cooling water, a concentration of iron in the cooling water, a concentration of silica in the cooling water, an optical measurement indicative of particles in the cooling water, an optical measurement indicative of fouling on a surface of the cooling water stream-side of the heat exchanger or an analogue thereof, and combinations thereof.

9. The method of claim 1, wherein receiving data indicative of scale fouling comprises receiving data from one or more sensors in line with the cooling water stream-side of the heat exchanger.

10. The method of claim 1, wherein receiving data indicative of corrosion fouling comprises receiving data selected from the group consisting of a concentration of iron in the cooling water, a concentration of copper in the cooling water, an optical measurement indicative of corrosion on a surface of the cooling water stream-side of the heat exchanger or an analogue thereof, a linear polarization resistance measurement indicative of corrosion rate on a surface of a probe in the cooling water stream-side of the heat exchanger, and combinations thereof.

11. The method of claim 10, wherein the analogue is a coupon of metal formed of a same metallurgy as a metal defining the cooling water stream-side of the heat exchanger.

12. The method of claim 1, wherein receiving data indicative of corrosion fouling comprises receiving data from one or more sensors in line with the cooling water stream-side of the heat exchanger.

13. The method of claim 1, wherein receiving data indicative of corrosion fouling comprises receiving data from one or more sensors associated with a model heat exchanger different than the heat exchanger for which heat transfer efficiency is monitored.

14. The method of claim 13, wherein the model heat exchanger receives and passes through cooling water that that is also passed through the heat exchanger for which heat transfer efficiency is monitored.

15. The method of claim 1, wherein receiving data indicative of biofouling comprises receiving data selected from the group consisting of a concentration of adenosine triphosphate in the cooling water, an amount of total organic carbon in the cooling water, a residual concentration of an oxidizing agent in the cooling water, an oxidation-reduction potential of the cooling water, an optical measurement indicative of particles in the cooling water, an optical measurement indicative of fouling on a surface of the cooling water stream-side of the heat exchanger or an analogue thereof, a fluorescence measurement indicative of microbial activity, and combinations thereof.

16. The method of claim 1, wherein receiving data indicative of biofouling comprises receiving data from one or more sensors in line with the cooling water stream-side of the heat exchanger.

17. The method of claim 1, further receiving, by the one or more processors, data indicative of at least one of a temperature of the cooling water and a pH of the cooling water.

18. The method of claim 1, wherein
determining the aggregate scale fouling score comprises summing each weighted data parameter indicative of scale fouling and determining an average thereof;
determining the aggregate corrosion fouling score comprises summing each weighted data parameter indicative of corrosion fouling and determining an average thereof;
determining the aggregate biofouling score comprises summing each weighted data parameter indicative of biofouling and determining an average thereof; and
determining the predicted cause of the detected change in the heat transfer efficiency trend comprises determining the predicted caused based on comparison of the aggregate scale fouling score to the aggregate corrosion fouling score and the aggregate biofouling score.

19. The method of claim 1, wherein determining the predicted cause of the detected change in heat transfer efficiency trend comprises applying a weighting factor to each received data parameter indicative of scale fouling, corrosion fouling, and biofouling.

20. The method of claim 1, wherein controlling addition of the chemical additive comprises controlling a chemical additive selected to counteract the predicted cause, wherein the predicted cause is selected from the group consisting of scale fouling, corrosion fouling, and biofouling.

21. The method of claim 1, wherein controlling addition of the chemical additive comprises at least one of:
increasing a flow rate at which the chemical additive selected to counteract the predicted cause is introduced into the cooling water stream, and
initiating a flow of the chemical additive selected to counteract the predicted cause.

22. The method of claim 1, further comprising:
determining an alternative predicted cause of the detected change in the heat transfer efficiency trend if the heat transfer efficiency trend does not change beyond a threshold amount in response to the controlled addition of the chemical additive selected to counteract the predicted cause; and
controlling addition of an alternative chemical additive into cooling water that is in fluid communication with the cooling water stream-side of the heat exchanger, the alternative chemical additive being selected to counteract the alternative predicted cause.

23. The method of claim 1, further comprising, prior to monitoring the heat transfer efficiency of the heat exchanger, surveying a plurality of heat exchangers within a heat exchanger network to identify at least one critical heat exchanger,
wherein monitoring the heat transfer efficiency of the heat exchanger and establishing the heat transfer efficiency trend comprises monitoring the heat transfer efficiency of the critical heat exchanger and establishing the heat transfer efficiency trend of the critical heat exchanger.

24. The method of claim 23, wherein the critical heat exchanger is selected based on at least one of maintenance history of each of the plurality of heat exchangers, operating performance of each of the plurality of heat exchangers, bypass alternatives for each of the plurality of heat exchangers, and combinations thereof.

25. The method of claim 1, wherein the chemical additive is injected at a cooling tower upstream of an inlet of the heat exchanger that receives the cooling water stream entering the heat exchanger.

26. The method of claim 1, wherein the chemical additive is selected from the group consisting of a scale inhibitor, a corrosion inhibitor, a biocide, a pH control agent, and combinations thereof.

27. The method of claim 1, wherein a process stream on the process stream-side of the heat exchanger comprises an organic-based chemical.

28. A method comprising:
evaluating a plurality of heat exchangers within a cooling water circuit and identifying at least one of the plurality of heat exchangers that is a critical heat exchanger;
monitoring a heat transfer efficiency of the critical heat exchanger and determining a change in the heat transfer efficiency indicative of fouling;
receiving data indicative of a plurality of different potential fouling mechanisms occurring in the critical heat exchanger, including scale fouling, biofouling, and corrosion fouling;
determining a predicted cause of the change in the heat transfer efficiency trend based on the received data indicative of the plurality of different potential fouling mechanisms by at least applying a weighting factor to each received data parameter indicative of the plurality of different fouling mechanisms; and
controlling addition of a chemical additive into a cooling water that is in fluid communication with critical heat exchanger based on the predicted cause.

29. The method of claim 28, wherein monitoring the heat transfer efficiency comprises receiving data from a plurality of sensors indicative of at least a temperature of the cooling water stream entering the critical heat exchanger, a temperature of the cooling water stream exiting the critical heat exchanger, a temperature of a process stream entering the critical heat exchanger, a temperature of the process stream exiting the critical heat exchanger, and a flow rate of the cooling water.

30. The method of claim 28, wherein determining a change in the heat transfer efficiency indicative of fouling comprises performing a comparison between a measurement period heat transfer efficiency trend and an earlier-established heat transfer efficiency trend.

31. The method of claim 30, wherein the comparison is one of a difference and a ratio between the measurement period heat transfer efficiency trend and the earlier-established heat transfer efficiency trend.

32. The method of claim 30, further comprising time-normalizing the measurement period heat transfer efficiency trend and the earlier-established heat transfer efficiency trend and performing the comparison on time-normalized trends.

33. The method of claim 29, wherein applying the weighting factor to each received data parameter comprises determining, for at some of the received data parameters, an amount of change for the received data parameter between the received data parameter as measured after determining the change in heat transfer efficiency as compared to the received data parameter as measured prior to the change in heat transfer efficiency, and applying the weighting parameter to the amount of change.

34. The method of claim 28, wherein determining the predicted cause of the detected change in heat transfer efficiency trend further comprises determining an aggregate scale fouling score based on the received data indicative of scale fouling, an aggregate corrosion fouling score based on the received data indicative of corrosion fouling, and an aggregate biofouling score based on the received data indicative of biofouling.

35. The method of claim 34, wherein
determining the aggregate scale fouling score comprises summing each weighted data parameter indicative of scale fouling and determining an average thereof;
determining the aggregate corrosion fouling score comprises summing each weighted data parameter indicative of corrosion fouling and determining an average thereof;
determining the aggregate biofouling score comprises summing each weighted data parameter indicative of biofouling and determining an average thereof; and
determining the predicted cause of the detected change in the heat transfer efficiency trend comprises determining the predicted caused based on comparison of the aggregate scale fouling score to the aggregate corrosion fouling score and the aggregate biofouling score.

36. A method comprising:
monitoring, by one or more processors, a heat transfer efficiency of at least one heat exchanger and establishing a heat transfer efficiency trend for the heat exchanger, the heat exchanger having a process stream-side and a cooling water stream-side;
detecting, by the one or more processors, a change in the heat transfer efficiency trend;
receiving, by the one or more processors, data indicative of scale fouling on the cooling water stream-side;
receiving, by the one or more processors, data indicative of corrosion fouling on the cooling water stream-side;
receiving, by the one or more processors, data indicative of biofouling on the cooling water stream-side;
determining, by the one or more processors, a predicted cause of the detected change in the heat transfer efficiency trend based at least on the received data indicative of scale fouling, corrosion fouling, and biofouling;
controlling addition of a chemical additive into a cooling water that is in fluid communication with the cooling water stream-side of the at least one heat exchanger based on the predicted cause;
determining an alternative predicted cause of the detected change in the heat transfer efficiency trend if the heat transfer efficiency trend does not change beyond a threshold amount in response to the controlled addition of the chemical additive selected to counteract the predicted cause; and
controlling addition of an alternative chemical additive into cooling water that is in fluid communication with the cooling water stream-side of the heat exchanger, the alternative chemical additive being selected to counteract the alternative predicted cause.

37. The method of claim 36, wherein:
receiving data indicative of scale fouling comprises receiving data selected from the group consisting of a concentration of phosphate in the cooling water, a concentration of calcium in the cooling water, a concentration of manganese in the cooling water, a concentration of aluminum in the cooling water, a concentration of iron in the cooling water, a concentration of silica in the cooling water, an optical measurement indicative of particles in the cooling water, an optical measurement indicative of fouling on a surface of the cooling water stream-side of the heat exchanger or an analogue thereof, and combinations thereof;
receiving data indicative of corrosion fouling comprises receiving data selected from the group consisting of a concentration of iron in the cooling water, a concentration of copper in the cooling water, an optical measurement indicative of corrosion on a surface of the cooling water stream-side of the heat exchanger or an analogue thereof, a linear polarization resistance measurement indicative of corrosion rate on a surface of a probe in the cooling water stream-side of the heat exchanger, and combinations thereof; and
receiving data indicative of biofouling comprises receiving data selected from the group consisting of a concentration of adenosine triphosphate in the cooling water, an amount of total organic carbon in the cooling water, a residual concentration of an oxidizing agent in the cooling water, an oxidation-reduction potential of the cooling water, an optical measurement indicative of particles in the cooling water, an optical measurement indicative of fouling on a surface of the cooling water stream-side of the heat exchanger or an analogue thereof, a fluorescence measurement indicative of microbial activity, and combinations thereof.

38. The method of claim 36, further comprising, prior to monitoring the heat transfer efficiency of the heat exchanger, surveying a plurality of heat exchangers within a heat exchanger network to identify at least one critical heat exchanger,
wherein monitoring the heat transfer efficiency of the heat exchanger and establishing the heat transfer efficiency trend comprises monitoring the heat transfer efficiency of the critical heat exchanger and establishing the heat transfer efficiency trend of the critical heat exchanger.

* * * * *

UNITED STATES PATENT AND TRADEMARK OFFICE
CERTIFICATE OF CORRECTION

| | |
|---|---|
| PATENT NO. | : 11,668,535 B2 |
| APPLICATION NO. | : 16/185817 |
| DATED | : June 6, 2023 |
| INVENTOR(S) | : Craig Myers et al. |

It is certified that error appears in the above-identified patent and that said Letters Patent is hereby corrected as shown below:

On the Title Page

Column 2, Line 10 of the item (57) Abstract, delete "waterfouling" and insert -- water fouling --

In the Claims

Column 35, Claim 3, Line 20, delete "m" and insert -- ṁ --

Column 36, Claim 14, Line 53, after "water" delete "that"

Column 38, Claim 33, Line 57, delete "claim 29," and insert -- claim 28, --

Signed and Sealed this
Twentieth Day of August, 2024

Katherine Kelly Vidal
*Director of the United States Patent and Trademark Office*